(12) United States Patent
Chapman et al.

(10) Patent No.: US 9,810,332 B2
(45) Date of Patent: Nov. 7, 2017

(54) PRESSURE RELIEF VALVE DEVICES AND METHODS

(71) Applicants: Eric M. Chapman, Santee, CA (US); Mark S. Olsson, La Jolla, CA (US)

(72) Inventors: Eric M. Chapman, Santee, CA (US); Mark S. Olsson, La Jolla, CA (US)

(73) Assignee: DEEPSEA POWER & LIGHT, INC., San Diego, CA (US)

( * ) Notice: Subject to any disclaimer, the term of this patent is extended or adjusted under 35 U.S.C. 154(b) by 695 days.

(21) Appl. No.: 14/229,770

(22) Filed: Mar. 28, 2014

(65) Prior Publication Data

US 2014/0347867 A1     Nov. 27, 2014

Related U.S. Application Data

(60) Provisional application No. 61/809,854, filed on Apr. 8, 2013.

(51) Int. Cl.
| | |
|---|---|
| F16K 17/06 | (2006.01) |
| F21V 31/03 | (2006.01) |
| F21V 31/00 | (2006.01) |
| F16K 17/04 | (2006.01) |
| F16K 1/42 | (2006.01) |
| F16K 1/46 | (2006.01) |
| F16K 15/06 | (2006.01) |

(52) U.S. Cl.
CPC ............... *F16K 17/06* (2013.01); *F16K 1/42* (2013.01); *F16K 1/465* (2013.01); *F16K 15/063* (2013.01); *F16K 17/04* (2013.01); *F21V 31/005* (2013.01); *F21V 31/03* (2013.01); *Y10T 137/7932* (2015.04)

(58) Field of Classification Search
CPC ......... F16K 15/063; F16K 17/04; F16K 17/06
See application file for complete search history.

(56) References Cited

U.S. PATENT DOCUMENTS

| | | | | |
|---|---|---|---|---|
| 1,994,770 A | * | 3/1935 | King ................. | F16K 17/04 137/533.21 |
| 2,908,288 A | * | 10/1959 | Carr .................. | F16K 17/06 137/524 |
| 3,200,839 A | * | 8/1965 | Gallagher .......... | F16K 1/46 137/516.29 |

(Continued)

FOREIGN PATENT DOCUMENTS

| | | |
|---|---|---|
| AT | 5687 U1 | 10/2002 |
| DE | 102005045730 | 4/2007 |

(Continued)

OTHER PUBLICATIONS

International Searching Authority, "Written Opinion of the International Searching Authority" for PCT Patent Application No. PCT/US14/032274, Oct. 8, 2015, European Patent Office, Munich.

*Primary Examiner* — Charlie Y Peng
(74) *Attorney, Agent, or Firm* — Steven C. Tietsworth, Esq.

(57) ABSTRACT

Pressure relief valves for use in high pressure applications that may include a conical shaped plunger, a body with a conical shaped mating surface corresponding to the shape of the conical shaped plunger, and one or more sealing elements, such as a pair of O-rings, are disclosed.

19 Claims, 24 Drawing Sheets

(56) References Cited

U.S. PATENT DOCUMENTS

| | | | | |
|---|---|---|---|---|
| 3,245,268 | A | * | 4/1966 | Archibald ................ G01N 1/12 |
| | | | | 166/164 |
| 3,542,057 | A | * | 11/1970 | Staiano .................. E03F 5/042 |
| | | | | 137/328 |
| 3,587,632 | A | | 6/1971 | Clay |
| 3,767,079 | A | * | 10/1973 | Jones ...................... F16K 13/06 |
| | | | | 137/71 |
| 4,493,434 | A | * | 1/1985 | Beaujean ................ F16K 1/306 |
| | | | | 137/630.14 |
| 4,699,292 | A | * | 10/1987 | Farrell ................... F16J 15/027 |
| | | | | 114/201 R |
| 5,258,242 | A | | 11/1993 | Dean et al. |
| 5,538,807 | A | | 7/1996 | Hagiuda |
| 7,077,162 | B2 | * | 7/2006 | Burdick ................... F16K 1/38 |
| | | | | 137/881 |
| 7,225,830 | B1 | | 6/2007 | Kershaw |
| 9,441,749 | B1 | * | 9/2016 | LaCroix ................ F16K 17/04 |
| 2009/0107564 | A1 | * | 4/2009 | Nitta ...................... F16K 17/06 |
| | | | | 137/543.17 |
| 2010/0246195 | A1 | | 9/2010 | Muller et al. |
| 2012/0008928 | A1 | * | 1/2012 | Ghali ..................... G03B 17/08 |
| | | | | 396/27 |
| 2012/0142276 | A1 | | 6/2012 | Cho et al. |

FOREIGN PATENT DOCUMENTS

| | | | |
|---|---|---|---|
| DE | 102006021236 | | 12/2007 |
| EP | 1865239 | | 12/2007 |
| GB | 2243431 A | * | 10/1991 ......... F16K 17/0413 |
| JP | H0317481 | | 2/1991 |

\* cited by examiner

PRESSURE RELIEF VALVE DEVICES AND METHODS

CROSS-REFERENCE TO RELATED APPLICATIONS

This application claims priority under 35 U.S.C. §119(c) to U.S. Provisional Patent Application Ser. No. 61/809,854, entitled PRESSURE RELIEF VALVE DEVICES AND METHODS, filed Apr. 8, 2013, the content of which is incorporated by reference herein in its entirety for all purposes.

FIELD

This disclosure relates generally to pressure relief valve ("PRV") assemblies and devices in which such PRVs are used. More specifically, but not exclusively, the present disclosure relates to pressure relief valves for use in devices for protecting against overpressure conditions, such as in underwater environments or environments where devices such as batteries outgas, as well as in other applications that require venting.

BACKGROUND

Pressure relief valve devices have been implemented in various pressure housings, such as, for example, devices used in underwater environments, devices that include rechargeable batteries, and other applications that require venting. Examples include underwater lights for deep ocean or other high pressure use, corresponding underwater cameras, underwater power supplies, as well as test instruments or other devices. In such cases, excess internal pressure may build inside of the housing, thereby making the device unsafe for handling (e.g.—spontaneous rupture).

For example, in a pressure housing containing lights, cameras, instrumentation, or other equipment used in deep ocean environments, pressure may build up within the device at depth, and when the device is returned to the surface the internal pressure can cause explosion if not properly released. Likewise, in battery-powered devices, outgassing from internal batteries can cause pressure build up that can result in explosive release. Consequently, it is imperative to release this internal pressure in a safe, controlled manner. Current pressure relief valve devices can suffer from leaks due to improper sealing for high pressure environments, the body of the pressure relief valve may be too large for a desired application, or the valve may have other disadvantages in size, weight, cost, or performance.

Accordingly, there is a need in the art to address the above-described as well as other problems with improved pressure relief valves for various applications.

SUMMARY

This disclosure relates generally to pressure relief valve assemblies and devices used in various applications that require venting, such as underwater lights, cameras, or batteries. More specifically, but not exclusively, the disclosure relates to pressure relief valves used in devices for protecting against overpressure conditions, such as in deep ocean environments, devices which include rechargeable batteries, and other applications that require venting.

For example, in one aspect, the disclosure relates to a pressure relief valve device. The pressure relief valve device may include, for example, a body. The pressure relief valve device may further include a plunger disposed in the interior volume of the body, and may be sealed against the body with two or more sealing elements. The sealing elements may be two O-rings.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Overview

It is noted that as used herein, the term, "exemplary" means "serving as an example, instance, or illustration". Any aspect, detail, function, implementation, and/or embodiment described herein as "exemplary" is not necessarily to be construed as preferred or advantageous over other aspects and/or embodiments.

The following exemplary embodiments are provided for the purpose of illustrating examples of various aspects, details, and functions of embodiments of the present invention; however, the described embodiments are not intended to be in any way limiting. It will be apparent to one of ordinary skill in the art that various aspects may be implemented in other embodiments within the spirit and scope of the present invention.

This disclosure relates generally to pressure relief valve assemblies and devices used in various applications that require venting. More specifically, but not exclusively, the present disclosure relates to pressure relief valves used in devices for protecting against overpressure conditions, such as in underwater environments, devices which include rechargeable batteries, and other applications that require venting.

For example, in one aspect, the disclosure relates to a pressure relief valve device. The pressure relief valve device may include, for example, a body. The pressure relief valve device may further include a plunger assembly disposed in the interior volume of the body, and may be sealed against the body with two or more sealing elements. The sealing elements may be two O-rings.

Example Embodiments

Various additional aspects, features, and functions are described below in conjunction with the embodiments illustrated in the appended drawing figures. In addition, in some embodiments where sealed batteries are used, details of embodiments of pressure relief apparatus and devices that may be used in combination with the disclosure herein to implement vented intelligent batteries are described in U.S. patent application Ser. No. 13/532,721, filed Jun. 25, 2012, entitled MODULAR BATTERY PACK APPARATUS, SYSTEMS, AND METHODS as well as U.S. patent application Ser. No. 13/925,636, filed Jun. 24, 2013, entitled MODULAR BATTERY PACK APPARATUS, SYSTEMS, AND METHODS INCLUDING VIRAL DATA AND/OR CODE TRANSFER, both of which are incorporated by reference herein in their entirety.

Figure 1:
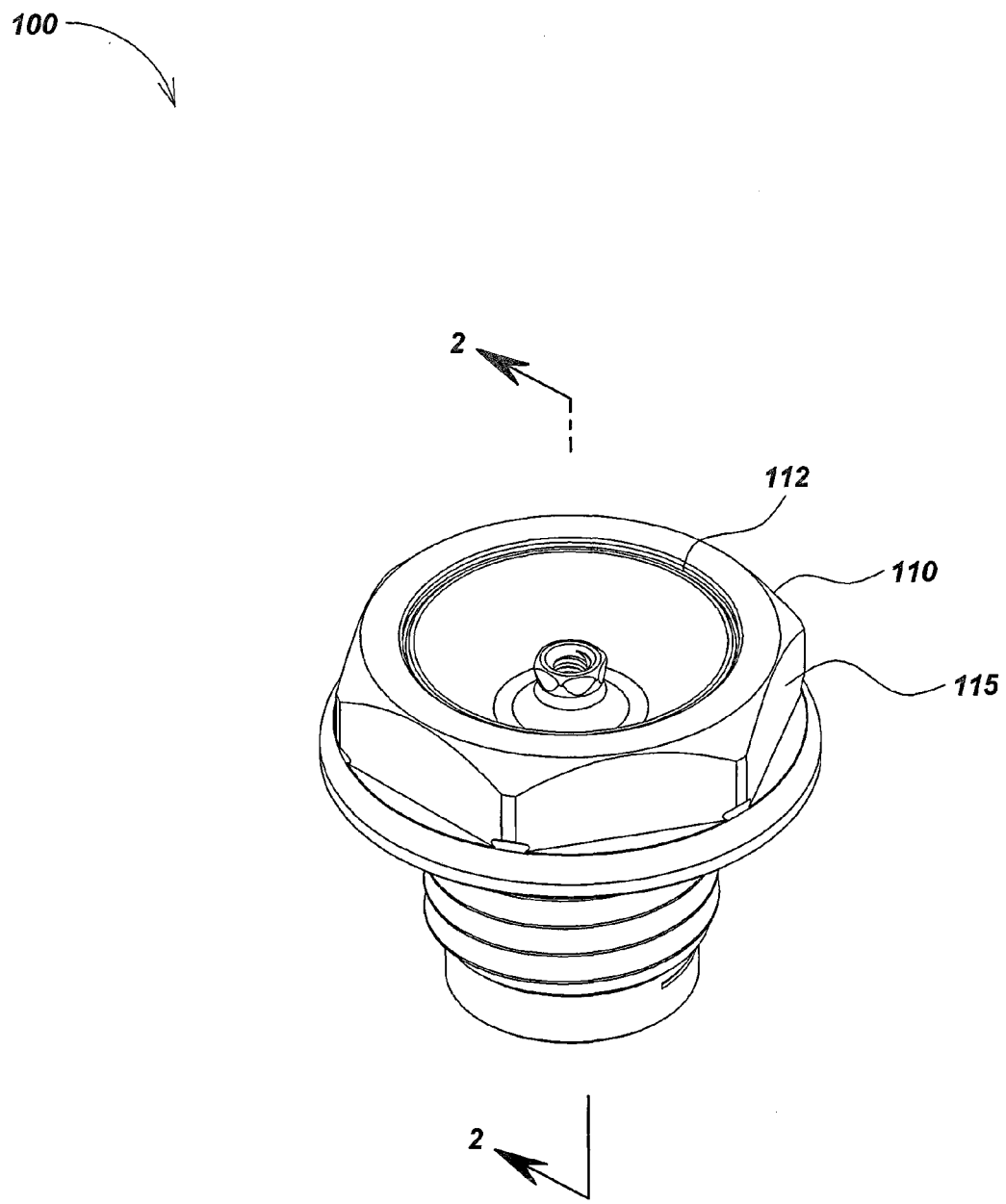
FIG. 1 is an isometric view of an embodiment of a pressure relief valve in accordance with certain aspects.

FIG. 1 illustrates an exemplary embodiment of a pressure relief valve (also denoted herein as a "PRV" for brevity) device 100 that may be used in an underwater housing, sealed battery device or system, or in other devices where pressure relief is required, such as in underwater lights, cameras, test instruments, and the like. In an exemplary embodiment, pressure relief valve 100 may include a housing or body 110, which may include various sealing and keying features as are described subsequently herein. A plunger assembly, which in an exemplary embodiment may be conical shaped, such as conical-shaped plunger assembly embodiment 112 as shown, may be disposed within body 110 and sealed with two O-rings or other sealing elements such as gaskets and the like. Various additional details of pressure relief valve embodiment 100 are further illustrated and described below. The body may include an external surface 115, such as a hex head or other surface for being gripped by a tool during installation or removal.

Figure 2:
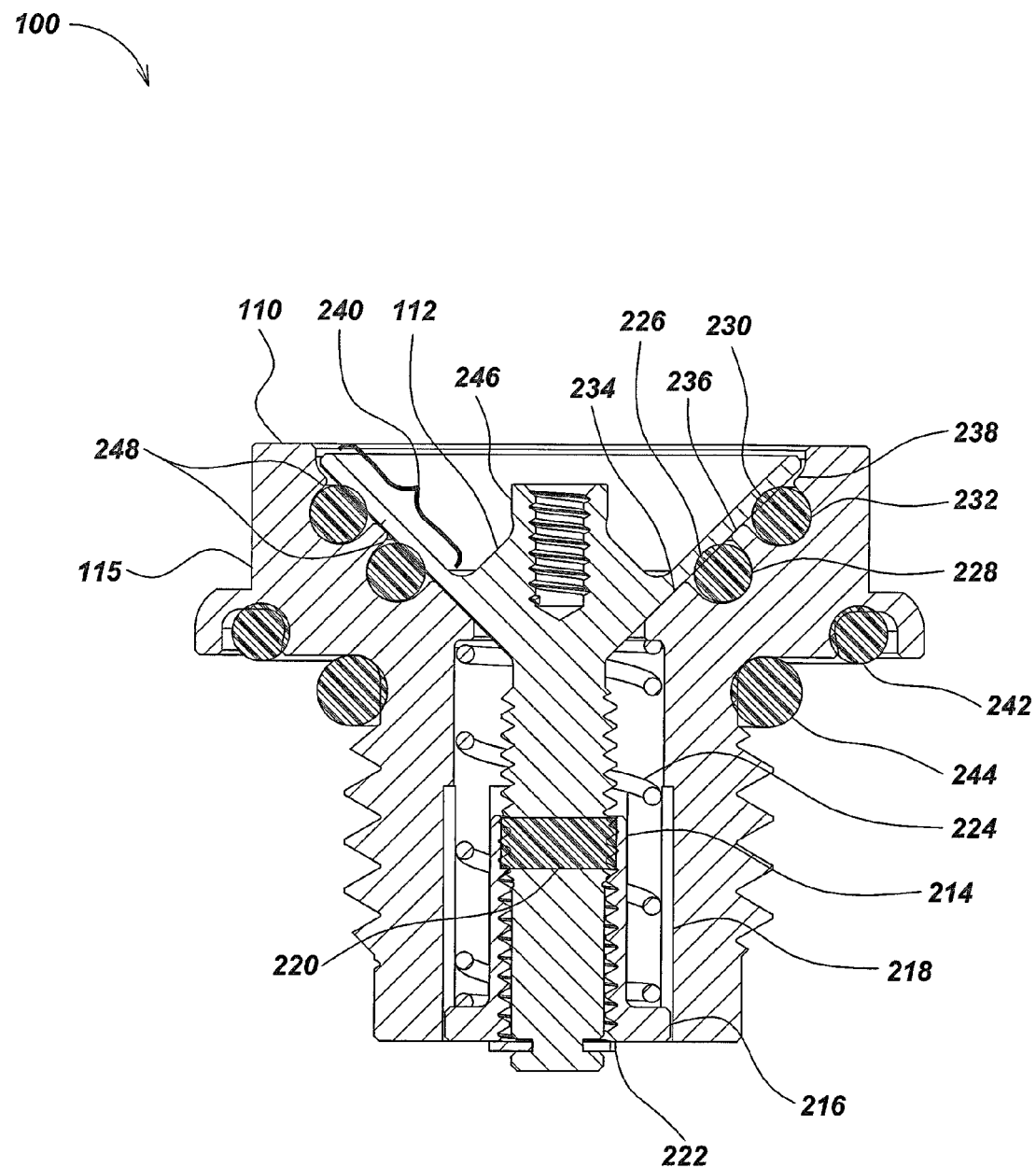
FIG. 2 is a section view of the pressure relief valve embodiment of FIG. 1, taken along line 2-2, illustrating details of the interval valve configuration.

Turning to FIG. 2, a sectional view of the pressure relief valve embodiment 100 of FIG. 1, taken along line 2-2, is illustrated. Device 100 may include one or more sealing elements, which may be disposed in the inner cavity of the body 110, such as in groove or slot. In an exemplary embodiment, the body inner cavity has a conical shape with mating surfaces matching corresponding mating surfaces on the plunger assembly. The groove or slot may be cut in the conical mating area to provide a dynamic seal between plunger 112 and body 110.

For example, an inner plunger O-ring 226 may be disposed in an inner plunger O-ring groove 228. An outer plunger O-ring 230 may be disposed in an outer plunger O-ring groove 232. The inner and outer O-ring grooves 228 and 232 may be formed in the valve body inner conical surface in one or more sizes and at one or more depths. In an exemplary embodiment, the plunger sealing O-ring grooves are approximately cut normal to the conical surface, thereby forming undercut edges 248 to aid in retention of O-rings 226 and 230, particularly under high flow rates (e.g., to prevent or reduce O-rings dislodging from their grooves when the PRV is discharging at a high flow rate). Further details of aspects of this configuration are described subsequently herein with respect to FIG. 22.

A valve plunger with a conical seat or sealing section 240 may be disposed within the valve body 110 such that the plunger's conical sealing section 240 rests against the conical inner and outer plunger support or mating surfaces 234 and 236 in the valve body 110. The plunger may be held in this position by compression spring 224, which pushes against the valve body 110 and the adjustment nut 216.

When resting on surfaces 234 and 236, the body and/or plunger conical section may be configured so that the plunger conical sealing section 240 has a gap 238 between the outer edge of the plunger 112 and the valve body 110 to allow plunger sealing section 240 to fully contact valve body plunger support surfaces 234 and 236 throughout some or all of the valve's operating range. The plunger sealing section 240 may be thin to be compliant at high external pressures, such as those encountered in the deep ocean below a depth such as, for example, 1000 meters, 3000 meters, 5000 meters, or in some case deeper depths, so as to enable deflection of sealing section 240. In embodiments where this configuration is used, the deflection of the plunger allows for more consistent metal to metal contact between the plunger and body. Such contact may be advantageous to fully close off both inner and outer plunger O-ring grooves 228 and 232. The ability of a seal to function at high pressures found at ocean depths may be related to the size of the gap between assembled parts that form the seal shape that contains a sealing ring. By reducing a sealing gland gap, sealing rings may be prevented from being extruded out of the design groove into the space between assembled parts and may prevent damage to the sealing ring, such as by crushing, tearing, etc. that may occur as a result.

Figure 20A:
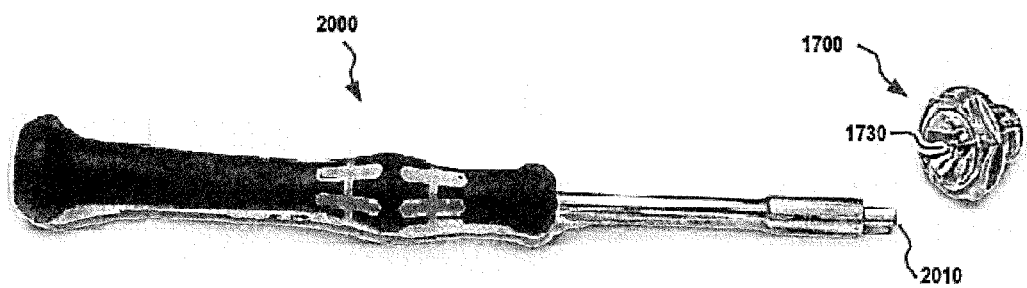
FIGS. 20A and 20B illustrate details of an embodiment of a PRV actuation pressure adjustment tool in use with a PRV embodiment in accordance with aspects herein.
Figure 20B:
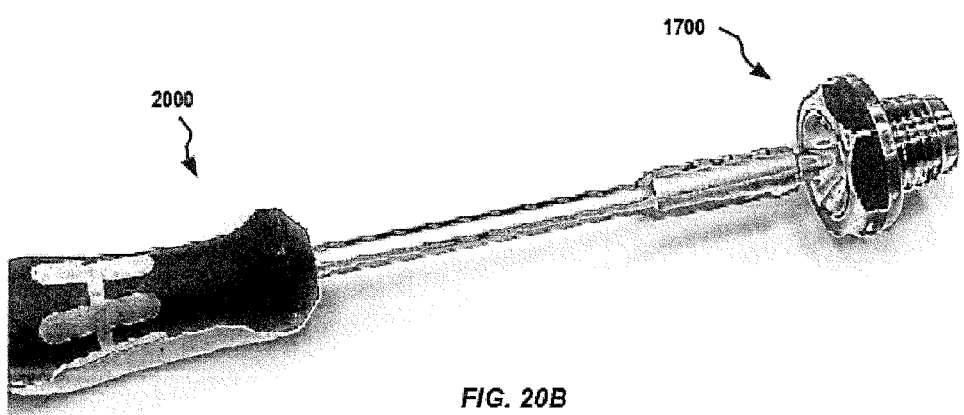

PRV embodiment 100 may also include a pressure relief valve adjustment nut 214 or other adjustment mechanism and a compression spring 224 that may be used to control a pressure relief valve set point. In operation, the nut 214 may be locked into a relative position within the body, allowing it to be moved upward or downward in response to rotation of the plunger and threaded adjustment section of the plunger. In this way, as the plunger is adjusted (e.g., as shown in FIGS. 20A and 20B), the nut moves up or down within the body, thereby increasing or decreasing the spring compression. A retaining clip 222 may be used to retain pressure relief valve nut 214 on the plunger, with the clip secured to the bottom of the plunger (as shown in FIG. 2). A plurality of anti-rotation fingers 216 may be used to lock the nut into a corresponding channel in the body. A pressure relief valve body anti-rotation groove 218 may be used to facilitate valve adjustment by allowing limited movement of the adjustment nut through the groove. Thread locking element 220 may be used to maintain set point during operation by limiting the ability of the adjustment nut or other adjustment mechanism to move relative to the plunger. PRV embodiment 100 may also include a mechanical adjustment element 246 for adjusting the valve set point, such as is shown in FIGS. 20A and 20B.

A pocket may be configured in the high pressure side. The pocket may be of various configurations, such as external hex with internal threads, internal hex with external threads, internal hex with external under grip, and/or other configurations as are known or developed in the art.

In an exemplary embodiment, PRV embodiment 100 may be mounted in a device subject to high pressure, such as in a deep sea pressure housing for lights, cameras, or in other devices or device bodies or housings. In such an embodiment, the PRV may be threaded into a corresponding tapped hole in the device and one or more sealing elements may be used to seal between the PRV and attached device. For example, a first O-ring 242 may be used to provide a face seal between pressure relief valve device 100 and the housing or other device (not shown). A second O-ring 244 may be used to provide a second seal between pressure relief valve device 100 and the housing or other device (not shown).

Figure 3:
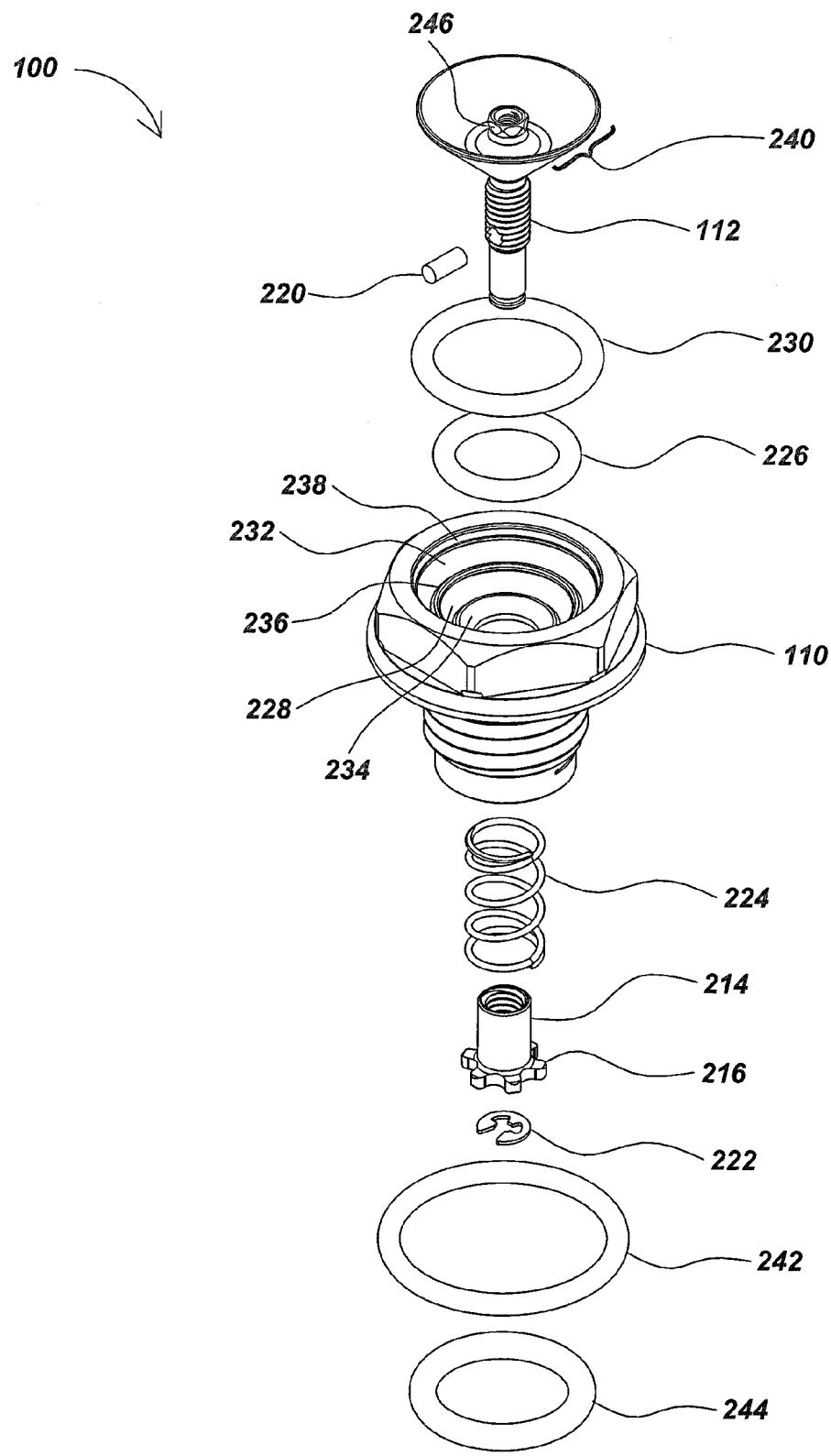
FIG. 3 is an exploded view of the pressure relief valve embodiment of FIG. 1, taken from the topside thereof, illustrating various elements of the valve.
Figure 4:
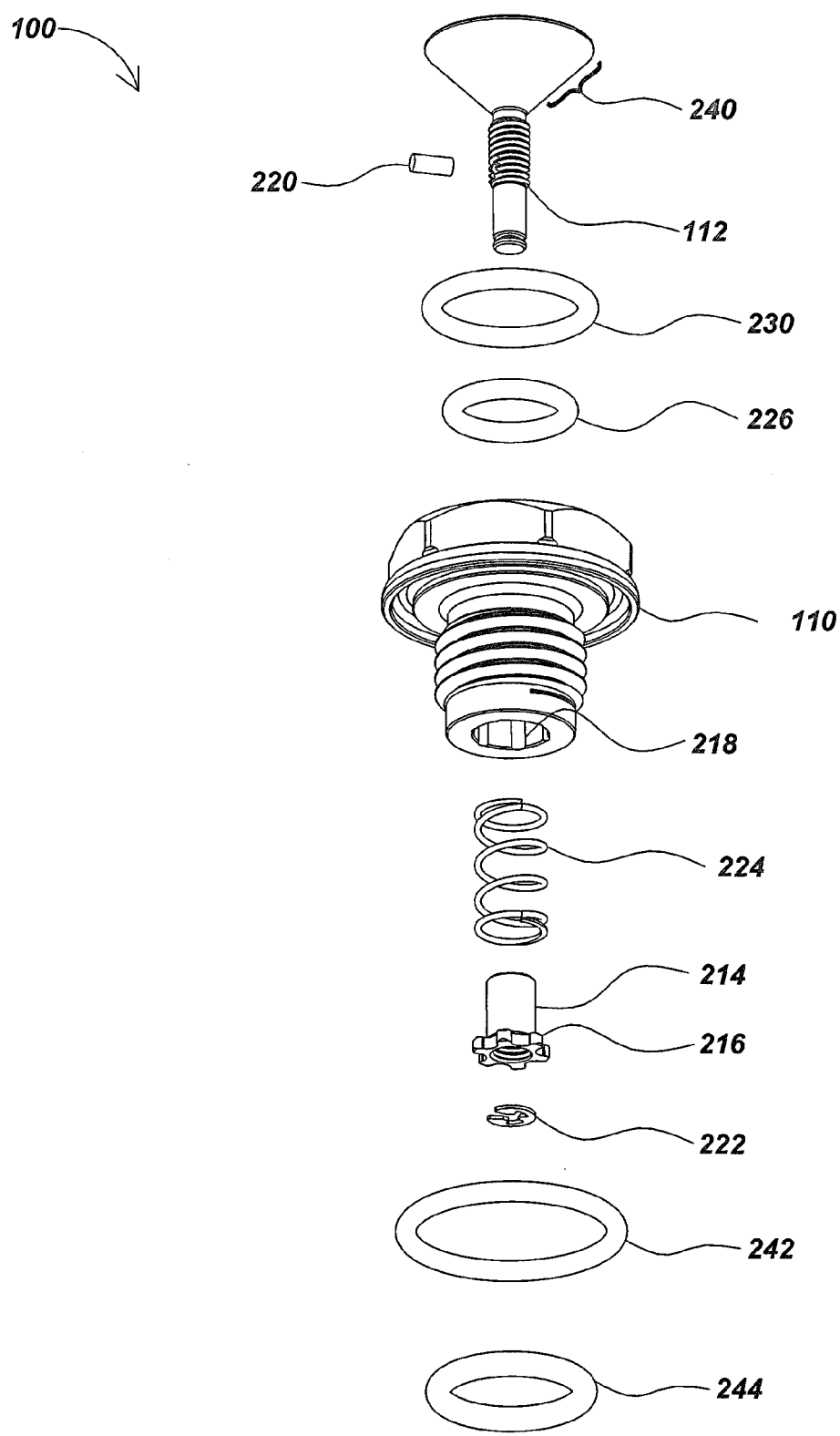
FIG. 4 is an exploded view of the pressure relief valve embodiment of FIG. 1, taken from the bottom side thereof, illustrating various elements of the valve.

FIGS. 3 and 4 are exploded views of the pressure relief valve device embodiment 100 of FIG. 1 illustrating additional details of the various components of an exemplary embodiment. In the following examples, plunger 112 may be coupled with the thin conical sealing structure 240 to provide seal shutoff, and the mechanical valve adjustment element 246 may be used to adjust the set point of the valve by turning it with an adjustment tool such as is shown in FIG. 20A and FIG. 20B. O-rings 226 and 230 may be disposed between the plunger and grooves 228 and 232 formed into the PRV body 110. Thread locking element 220 may be configured with the base of plunger 112 to maintain set point during operation.

Figure 17:
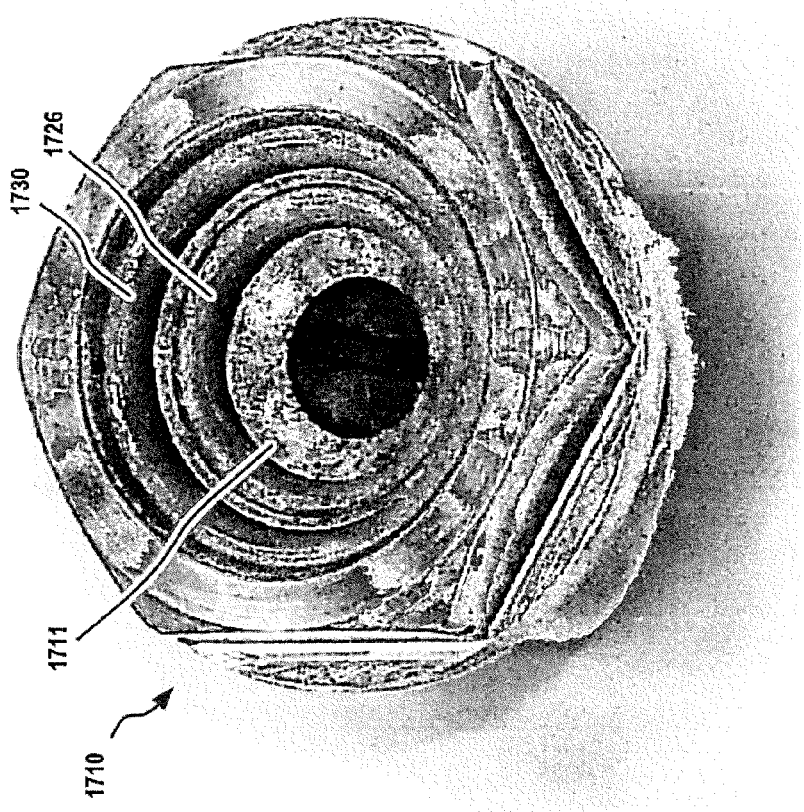
FIG. 17 illustrates details of a PRV including a plunger having a conical seat and a body having a corresponding conical mating surface with two O-ring seals.
Figure 17:
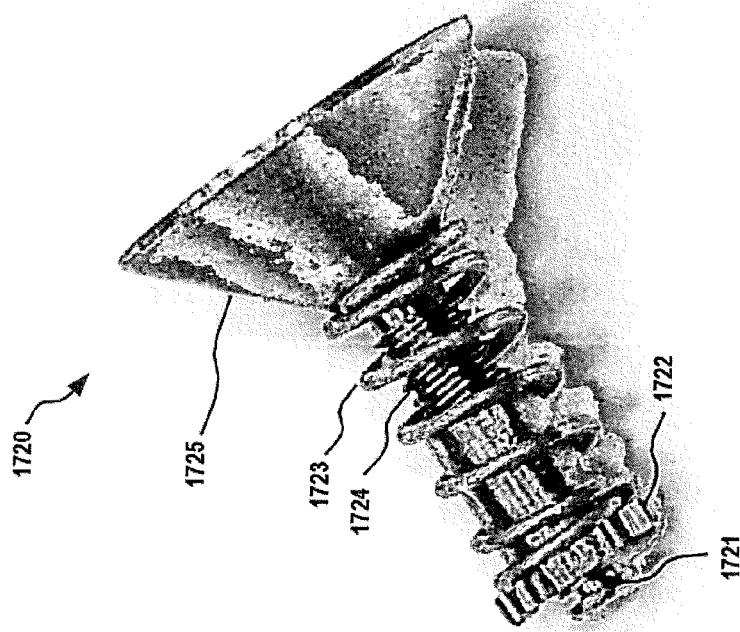
Figure 18:
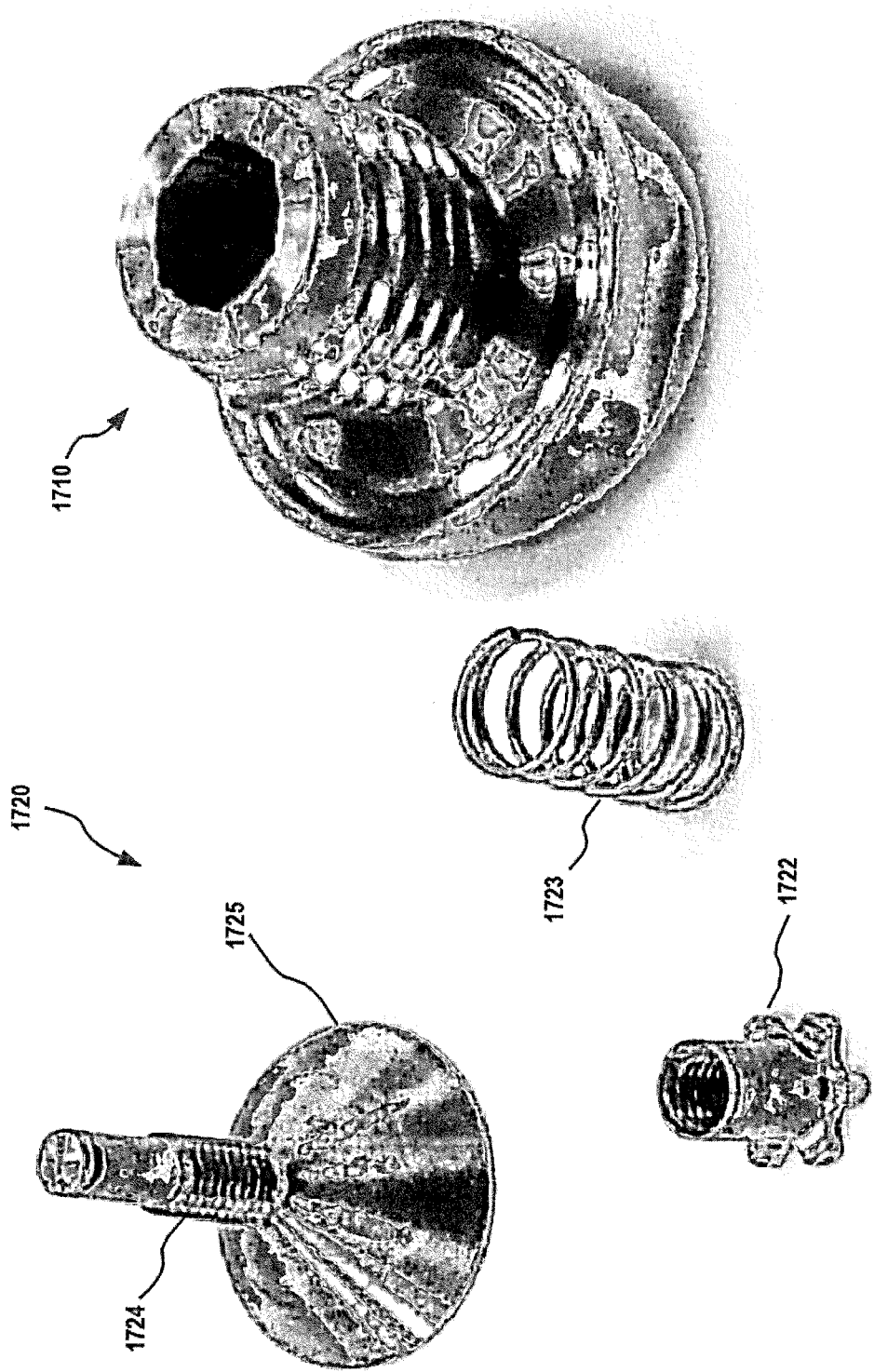
FIG. 18 illustrates details of elements of the PRV embodiment of FIG. 17.

In an exemplary embodiment, pressure relief valve adjustment nut 214 may be configured with anti-rotation fingers 216 and retaining clip 222, and may be disposed within compression spring 224. Such elements 214, 216, 222, and 224 may all be configured within the base of body 110. An example of an embodiment of a device as shown in FIG. 3 in titanium is shown in FIGS. 17-19, which are images of a prototype PRV embodiment. One or more O-rings, such as first O-ring 242 and second O-ring 244, may be used to provide a seal with an attached device such as a high pressure housing or sealed housing containing batteries (not shown).

Figure 5:
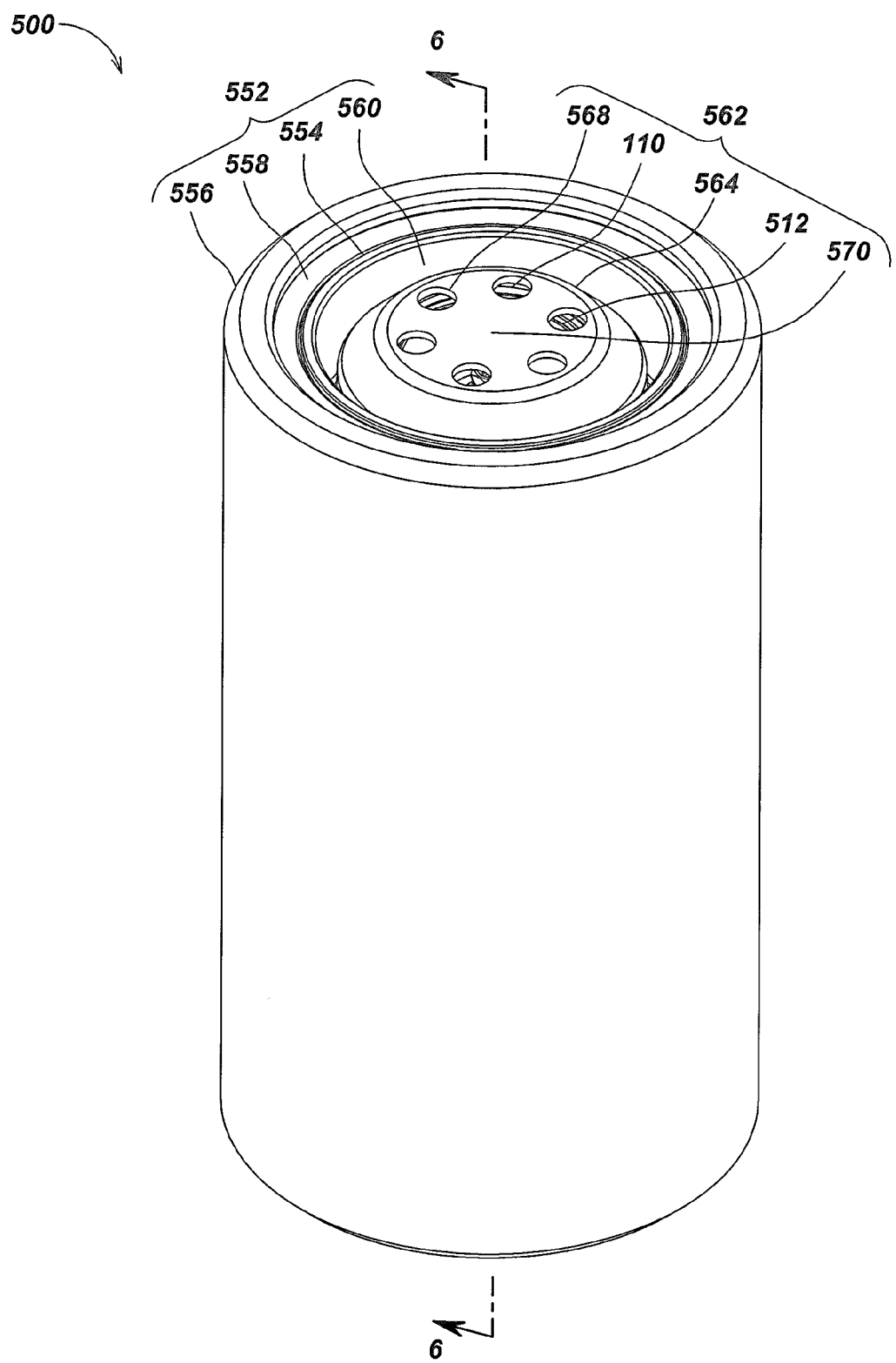
FIGS. 5-6 illustrate details of a PRV embodiment of a pressure vessel with offgassing electrical contacts.
Figure 6:
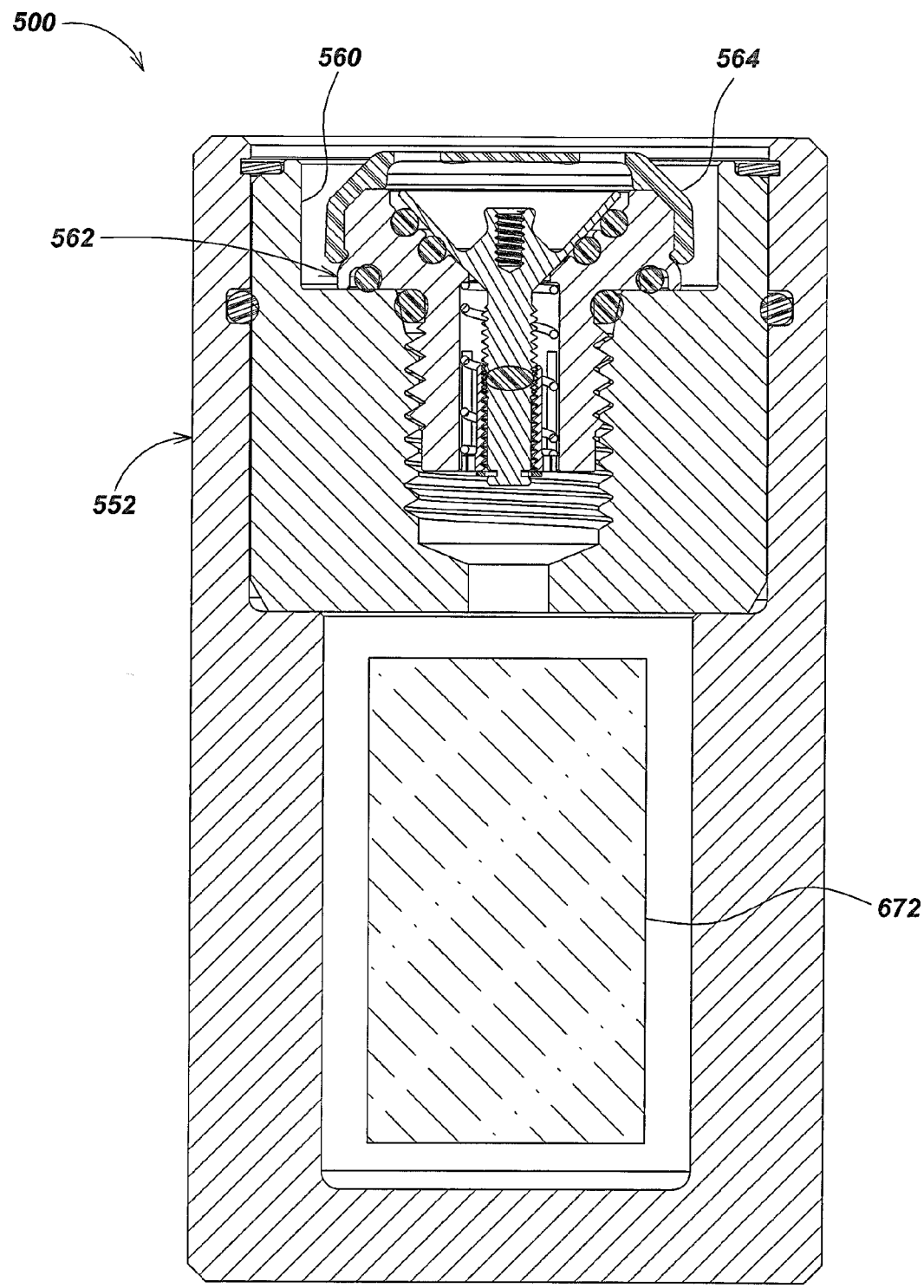

FIGS. 5-6 illustrate details of an embodiment of a pressure vessel 500 with a PRV embodiment in accordance with aspects herein, along with an offgassing electrical assembly 672 enclosed in a pressure housing assembly 552. Batteries may vent gases during charge or discharge cycles, and it may be desirable to vent these gases. As shown in FIG. 5, an offgassing electrical assembly 672, such as an assembly with one or more enclosed batteries, may be configured with a PRV for venting excess gases at pressure. PRV assembly 562 may include a protective cap 564, with one or more vent holes 568 in the cap, to allow gases to escape. A PRV plunger 512, which may have misaligned contact surfaces with the body, may be part of the PRV assembly. A PRV adjustment protector 570 may be used to limit access to the top of the PRV to prevent adjustment such as is described in FIG. 20A and FIG. 20B. The pressure vessel may include a retaining ring 558 to retain the PRV within the vessel as shown and an endcap 554.

Figure 7:
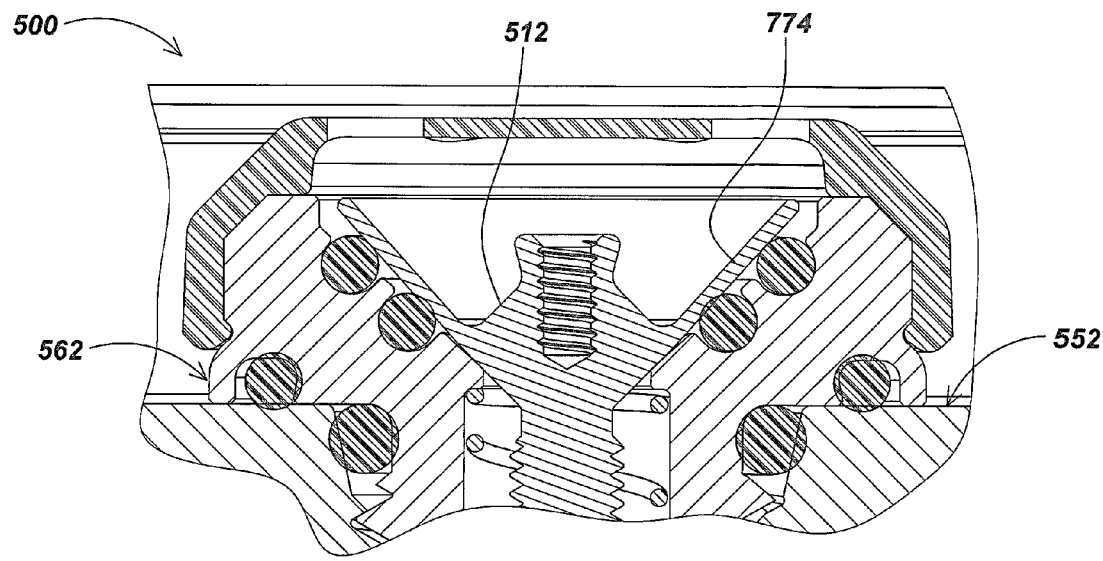
FIGS. 7-8 illustrate additional details of conical sealing surfaces with misalignment.
Figure 8:
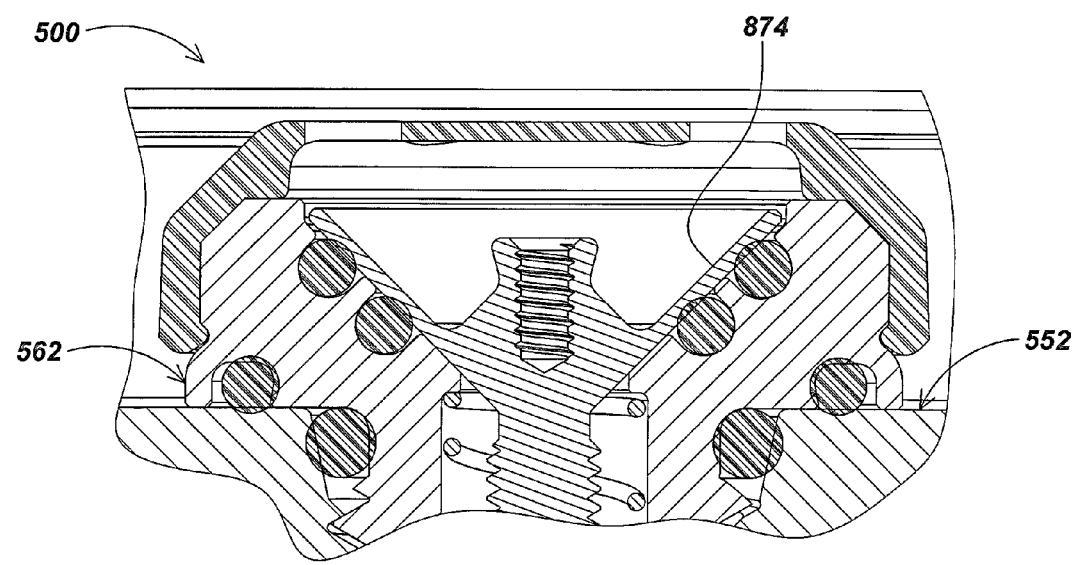

The protective cap may be used to limit access to and protect tampering with the PRV, such as in a safety environment where tampering may be harmful or catastrophic. At low external pressures, the conical sealing surfaces of the PRV may be misaligned, as shown at location 774 of FIG. 7. To address this, flexibility of the conical sub-segment of the PRV plunger may be used (e.g., thin metal or other materials that may flex somewhat to enhance sealing) and/or more compliant materials may be used for a part of, or for all of a plunger element. FIG. 8 illustrates a corresponding misalignment at high pressure at location 874.

Figure 9:
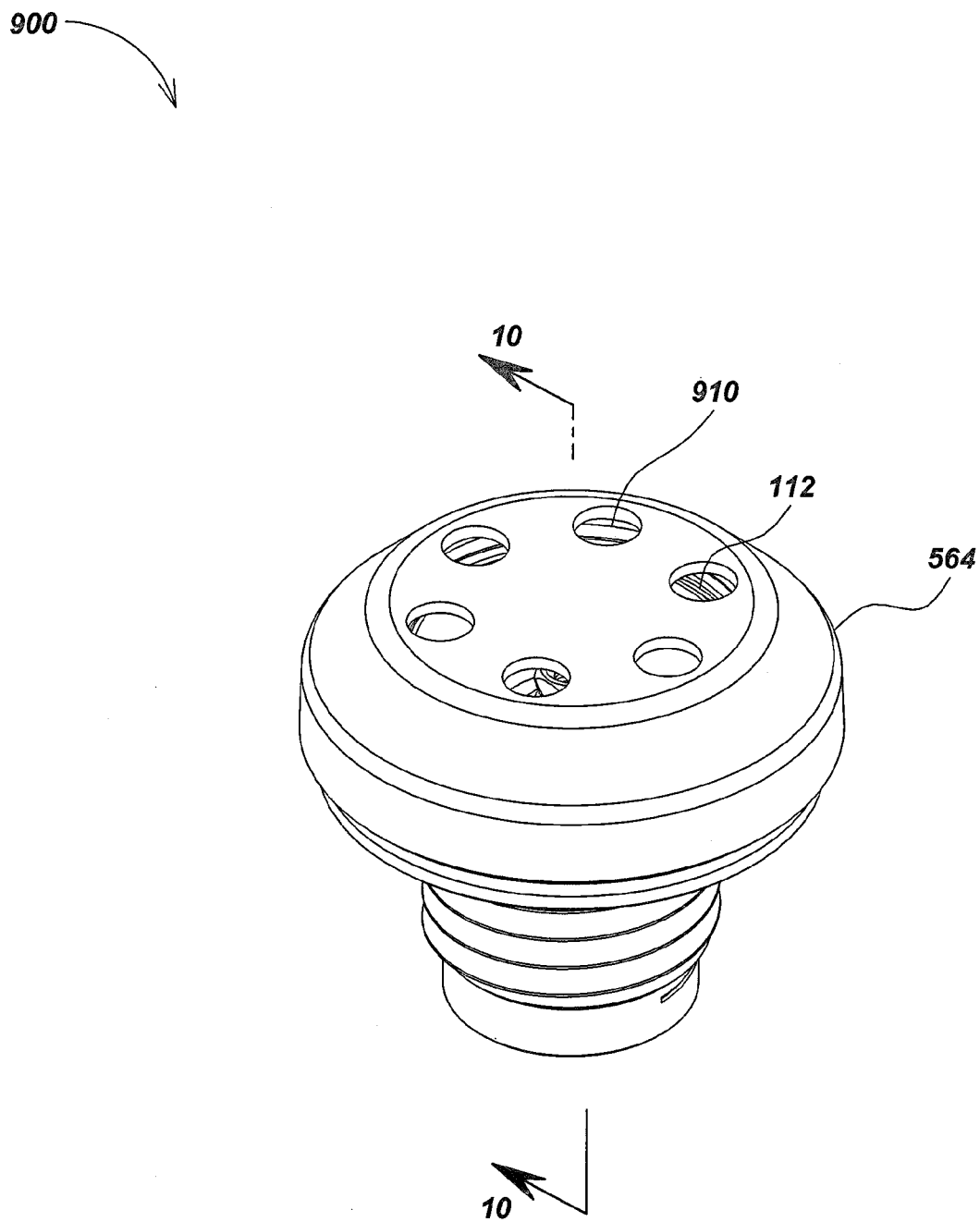
FIGS. 9-10 illustrate details of an alternate PRV embodiment using O-rings of different sizes and configured so that the outer O-ring engages first.
Figure 10:
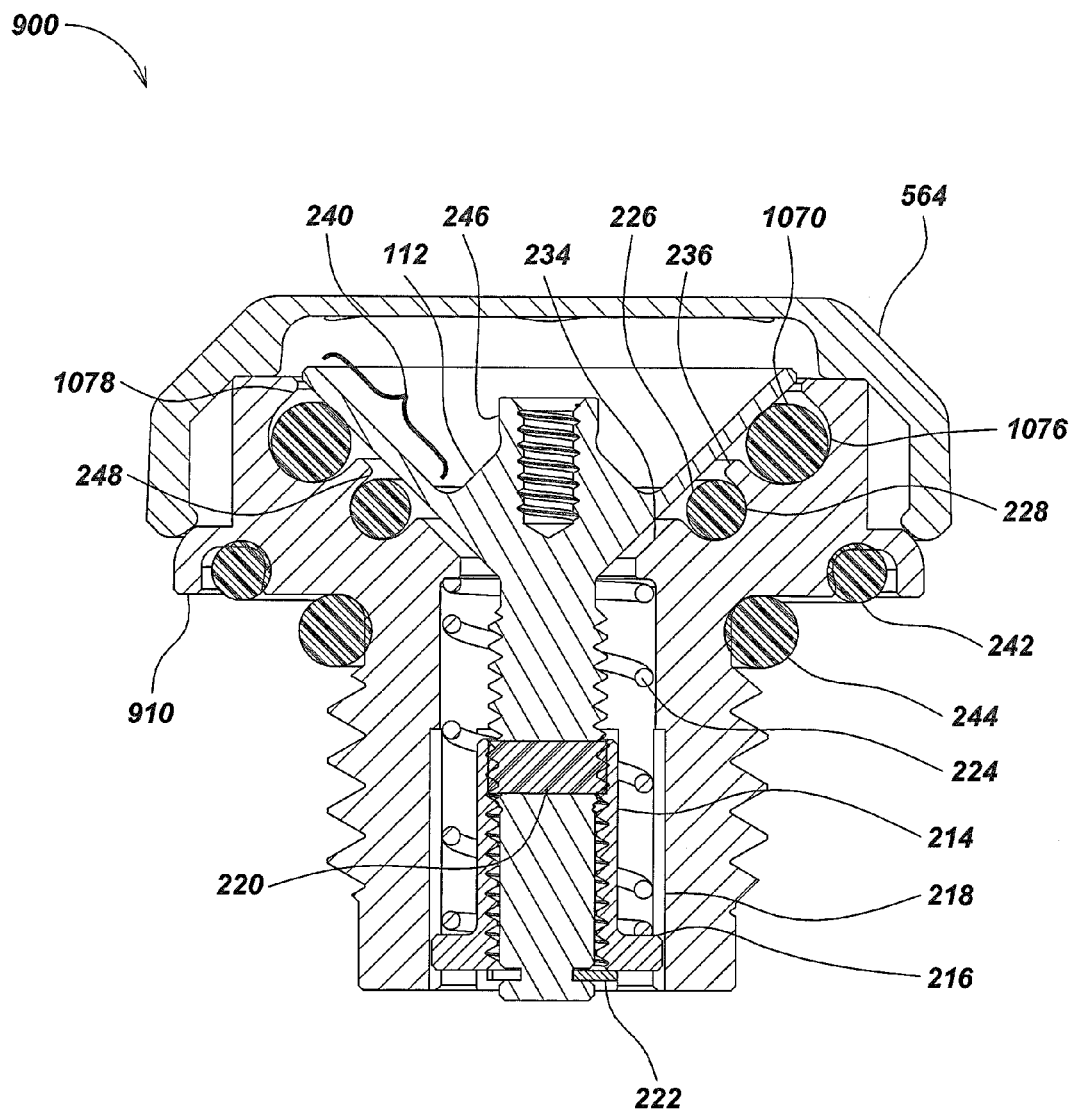

FIGS. 9 and 10 illustrate details of an embodiment of a PRV with two different sized O-rings sealing the conical sealing areas between the plunger and the base. As shown in FIG. 9, the PRV may include a protective cap 564 to limit access to the pressure setting mechanism, as well as a PRV body 910 with grooves (shown in FIG. 10) for two different size O-rings. The plunger assembly may be the same as or similar to plunger assembly 112 of FIG. 1. As shown in FIG. 10, a larger O-ring 1070 may be positioned near the upper area or outer opening of the body and may be disposed in larger groove 1076, while a smaller O-ring 248 may be disposed in smaller groove 228. An undercut lip 1078 may be formed in the body groove for the larger O-ring (and/or in some embodiments, the smaller O-ring 248). Other elements as shown in FIG. 9 and FIG. 10 may be the same as or similar to corresponding element of the embodiment of FIGS. 1-4. In some embodiments, one of the two O-rings may be omitted, such as to take advantage of more surface area for more consistent operation at lower cracking pressures.

Figure 11:
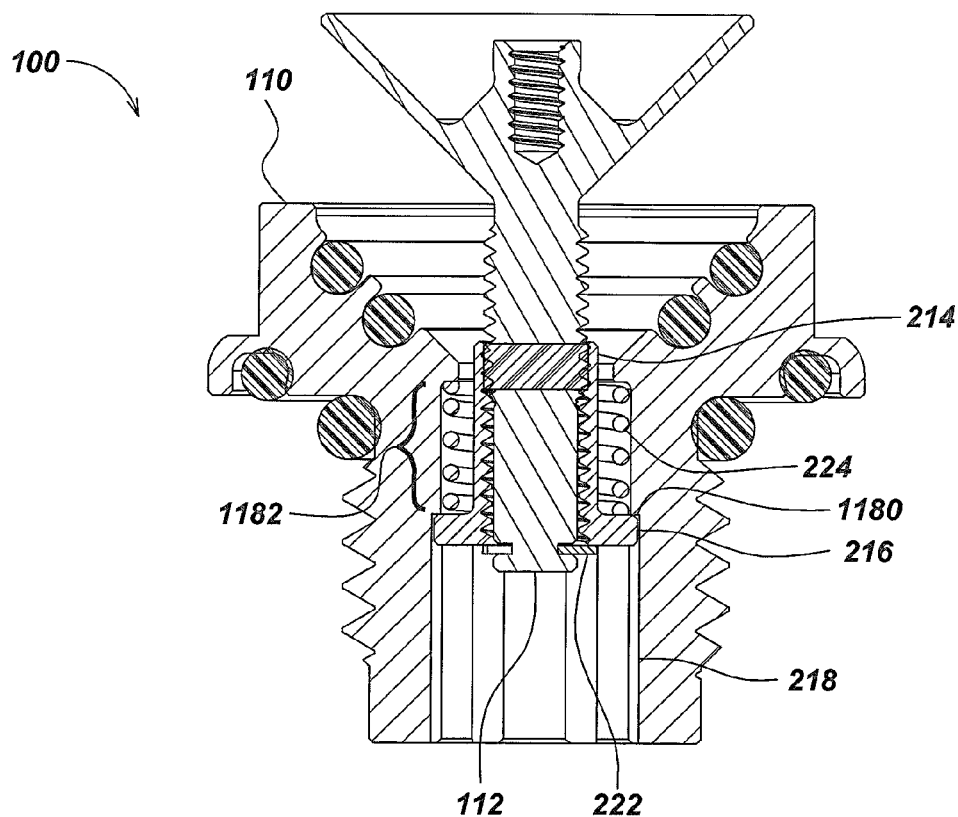
FIG. 11 illustrates an example PRV embodiment at maximum open condition, limiting adjustment range to a maximum value using a stop groove to stop adjustment nut travel.

FIG. 11 illustrates details of a PRV body embodiment showing a stop edge 1180 at the end of a PRV body anti-rotation groove. The stop edge may be formed in the body to prevent the compression spring from going beyond a yield point (e.g., by stopping the bottom edge of the nut within the body so that the spring cannot be compressed any further during high pressure discharge).

Figure 12:
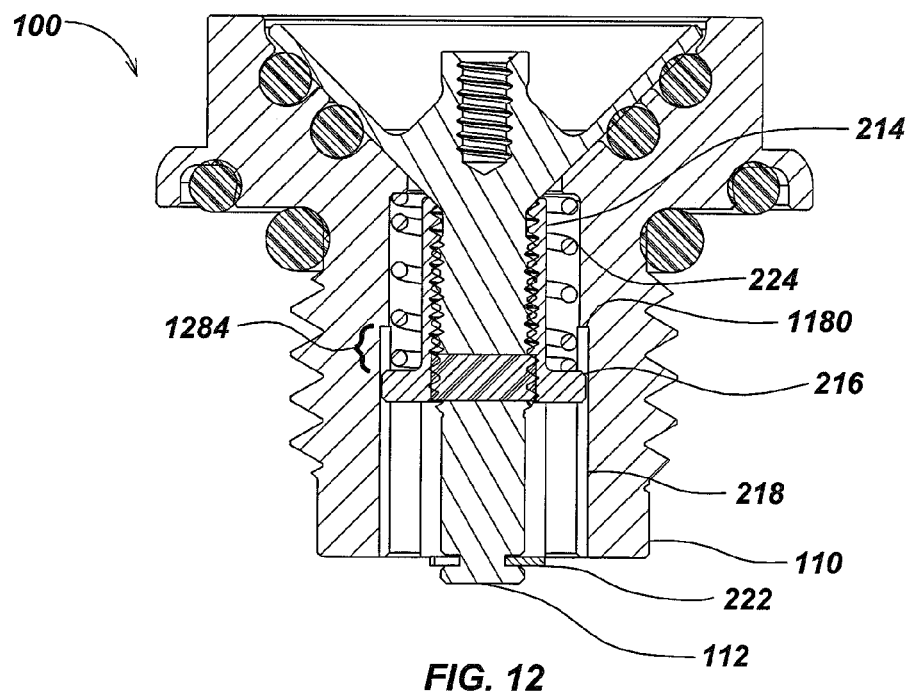
FIG. 12 illustrates details of one embodiment of a PRV with an adjustment nut configured to set the PRV to a higher actuation pressure.
Figure 13:
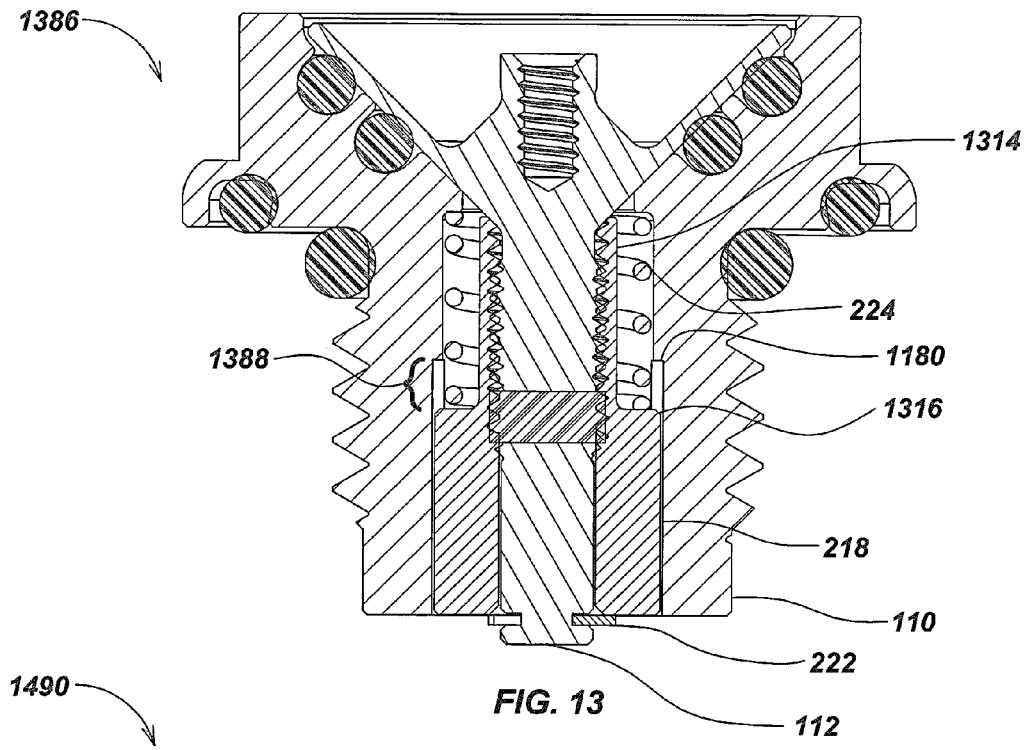
FIG. 13 illustrates details of one embodiment of a PRV with an adjustment nut configured to allow a very limited amount of pressure adjustment range so as to limit operation to a predefined range of actuation pressures.

FIG. 12 illustrates an example PRV embodiment wherein the plunger has been tightened until the adjustment nut 216 has been secured in its maximum position, with the top of the adjustment nut jammed against the bottom of the conical plunger section. In this configuration, the spring is highly compressed and applies a higher force with less travel (i.e., a maximum actuation pressure setting). Setting the adjustment nut to be in contact with the bottom of the plunger may be used to provide predefined actuation pressure by fixing the compression of the spring. This process will be dependent on consistent anti-rotation cavity sizes, spring materials and sizes, and other mechanical parameters; however, by extending the anti-rotation fingers of the adjustment nut to a precalibrated size, thereby defining the spring compression when the adjustment nut is secured against the bottom of the plunger as shown in FIG. 13, a predefined actuation pressure may be set easily by merely tightening the plunger until the adjustment nut is jammed against the plunger. In embodiments such as the one shown in FIG. 13, the PRV has limited adjustment range, which may be advantageous in applications where end user adjustment to a high actuation pressure would be detrimental or catastrophic.

Figure 14:
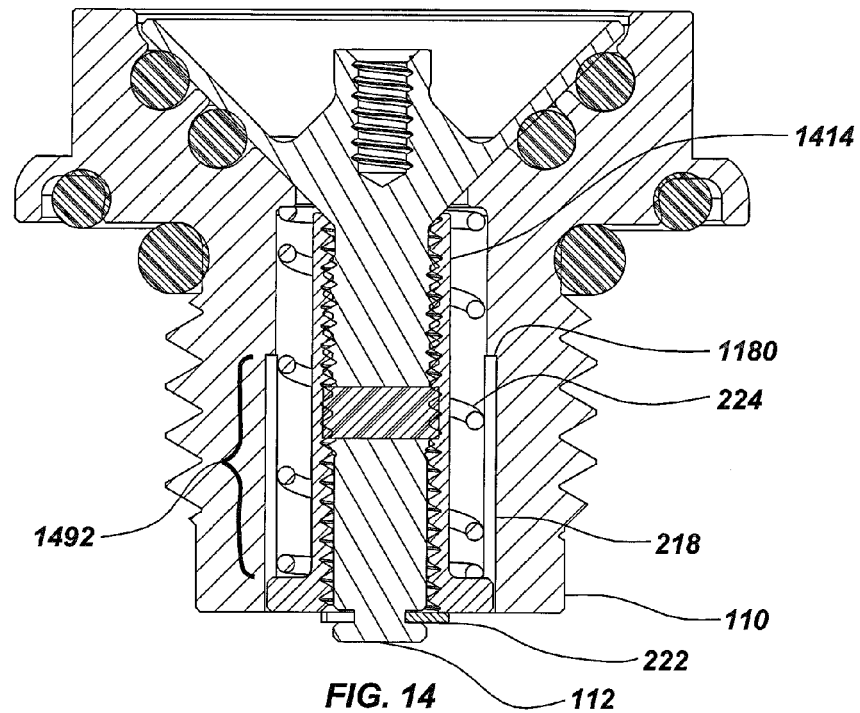
FIG. 14 illustrates details of one embodiment of a PRV with an adjustment nut configured to easily set the PRV to a predefined actuation pressure by adjusting the nut to contact the PRV plunger.

Nuts for different predefined pressures can be made by varying the length of the anti-rotation fingers, such as to provide a set of nuts corresponding to desired actuation pressures, without needing to calibrate the PRV on a pressure tester or other machine. The nuts may be printed, embossed, stamped, color-coded, or otherwise marked with their predefined pressures for easy use. For example, the relative long finger of FIG. 13 provides a high actuation pressure, with movement limited to range 1388, while the shorter anti-rotation fingers of FIG. 14 allow for a lower spring compression providing a lower actuation pressure, as well as greater movement range 1492. Other mechanism, such as spacers, stacked washers, and the like may also be used to limit or define actuation pressures mechanically.

Figure 15:
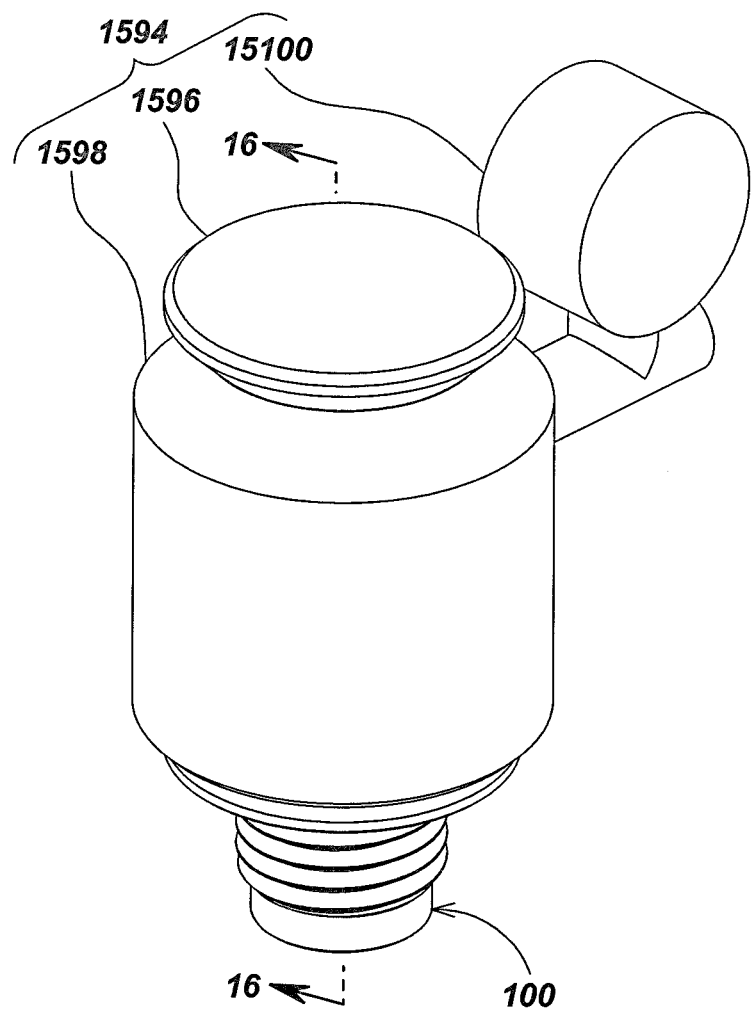
FIGS. 15 and 16 illustrate details of a vacuum adapter for purging a device using a PRV such as described herein.

FIG. 15 illustrates details of an embodiment of an assembly including a PRV embodiment 100 coupled to a vacuum adapter assembly embodiment 1594, further coupled to a vacuum source 15100. This assembly may be used for applications such as, for example, purging or drawing off undesirable offgas products from a device after assembly and before being put into service, or to purge or draw off undesirable offgas products after a product has been in service for some time without needing to disassemble the product. For example, some types of underwater lights may be serviced in this fashion after operating in the deep ocean for a period of time. Various other devices such as cameras, batteries, instruments, and the like may be similarly serviced in this fashion. The vacuum adapter assembly 1594 may include a PRV plunger retractor 1596 disposed within a PRV vacuum adapter body 1598. PRV 100 is at the bottom as shown in FIG. 15.

Figure 16:
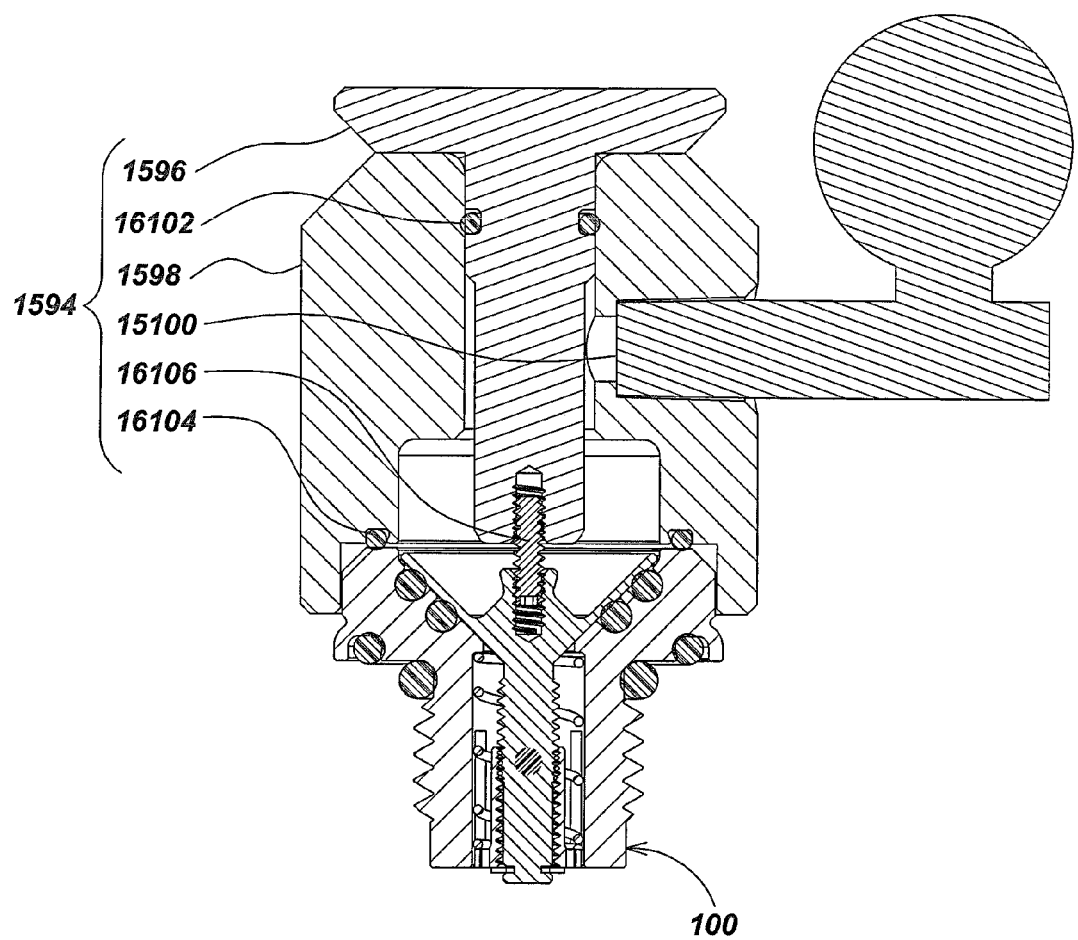

FIG. 16 illustrates a sectional view of the PRV embodiment coupled to the vacuum adapter embodiment of FIG. 15 showing additional details. As shown in FIG. 16, the vacuum adapter may include a plunger retractor seal 16102, which may be disposed within a groove or channel in the plunger retractor element 1596 to seal the retractor from the vacuum adapter body 1598. A PRV plunger retractor screw 16106 or threaded rod or other attachment mechanism may be coupled to the plunger 1596 as well as to the PRV plunger to facilitate retraction of the plunger. The assembly may include a PRV vacuum adapter body seal 16104 for providing sealing between PRV 100 body and the PRV vacuum adapter body 1598 to provide sealing therebetween. In operation, the PRV plunger retractor 1596 is pushed down until the PRV plunger retractor screw 16106 contact threads in the PRV plunger (i.e., pressure adjustment mechanism). The vacuum source 15100 may then be applied. The PRV plunger retractor 1596 and screw 16106 may then be turned into the PRV plunger until the retractor 1596 contacts the PRV vacuum adapter body 1598, and then pulls the PRV plunger open during vacuum purge. Retracting the plunger allows full vacuum to be applied to the product internals without having to fight PRV spring force, and also guarantees an open valve.

FIG. 17 illustrates details of elements of an embodiment of a pressure relief valve 1700, in accordance with aspects described herein, manufactured in titanium including a conical plunger assembly 1720 and a high pressure body assembly 1710. PRV embodiment 1700 may correspond with the PRV embodiment 100 of FIGS. 1-4. Although titanium may be used in exemplary embodiments, other materials capable of withstanding high external pressures and/or corrosion as may be encountered in ocean or other corrosive environments, such as, for example, stainless steel, aluminum, which may be coated, anodized, etc., high strength plastics such as PEEK or Ultem, high pressure ceramics, high strength nanostructured materials, and the like may also be used alone or in combination, such as in different component parts or elements, in various embodiments.

Plunger assembly 1720 may include a conical sealing sub-section 1725 with a conical outer shape to match a corresponding conical inner shape 1711 of body 1710. An adjustment sub-section 1724 may include a shaft or other segment, such as a threaded shaft section as shown, on which a nut 1722 may be screwed onto in order to adjust cracking pressure in conjunction with spring 1723. The bottom end 1721 of the plunger assembly may include a groove or other shape to receive a retaining clip (not shown), such as clip 222 shown in FIG. 2. In some embodiments, such as described previously with respect to FIG. 14, a fixed length nut may be calibrated to provide a predetermined release pressure. Other calibration mechanisms may also be used in alternate embodiments. The conical sub-section 1725 may be thin-walled or include a thin-walled section to allow the metal or other plunger material to flex or distort to further aid in sealing under high pressure. The particular wall thickness and/or material may be set based on a desired operating pressure, such as below 1000 meters, 3000 meters, 5000 meters, and the like.

Body 1710 may include a conical shaped interior volume 1711 in which one or more O-rings (in an exemplary embodiment inner O-ring 1726 and outer O-ring 1730) are positioned within grooves or channels in the body. In some embodiments, the O-rings may be of different sizes and/or the grooved, wherein the O-rings may be placed may be of different sizes and/or shapes, and/or depths below the surface. In this way, sealing may be variable between the mated surfaces, such as, for example, as a function of applied pressure.

FIG. 18 illustrates additional details of the elements of plunger assembly embodiment 1720 disassembled, including nut 1722, compression spring 1723, and the plunger with conical sub-section 1725 and adjustment section 1724. Body 1710 is shown from the opposite orientation as in FIG. 17 (i.e., from the bottom side).

Figure 19A:
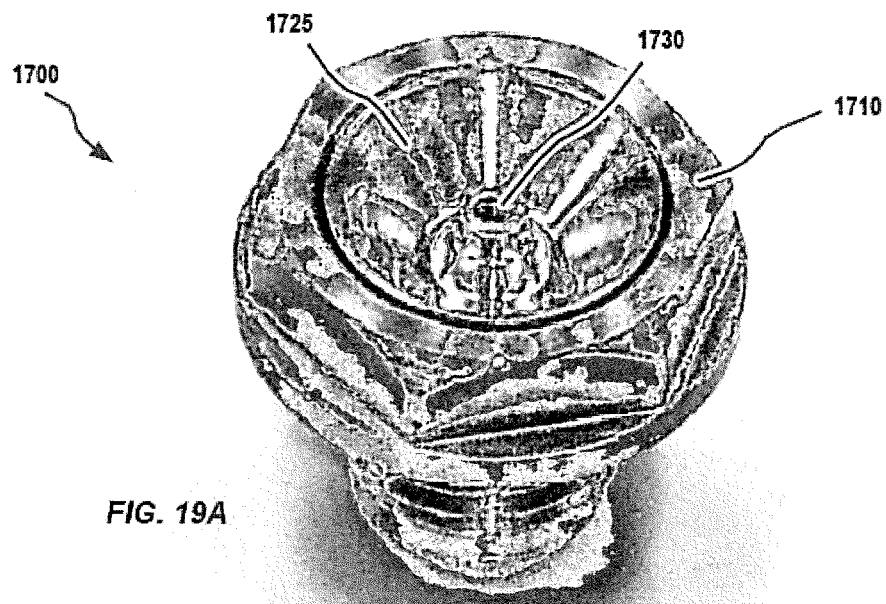
FIGS. 19A and 19B illustrate details of an assembled PRV embodiment from the top side (low pressure side) and bottom (high pressure) side.
Figure 19B:
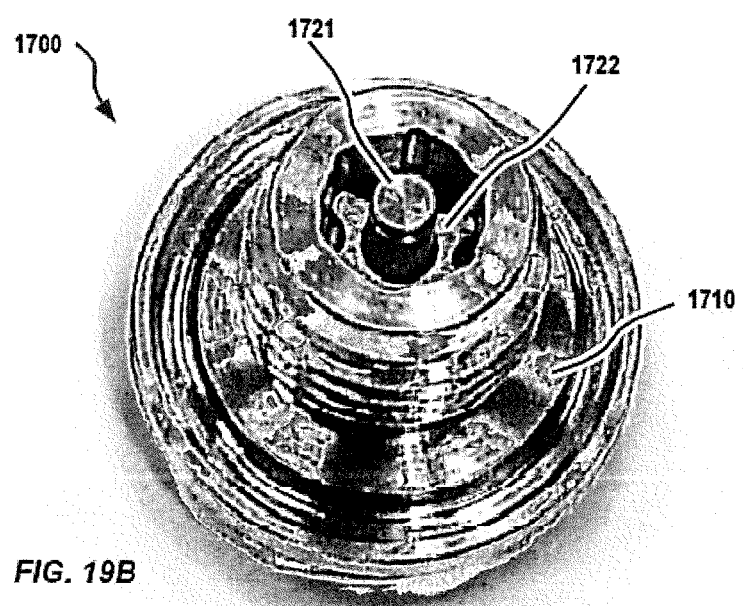

FIGS. 19A and 19B illustrate the PRV embodiment of FIG. 17 in an assembled configuration, from the top side in FIG. 19A and from the bottom side in FIG. 19B. As shown in FIG. 19A, which illustrates the PRV 1700 from the top side, a valve adjustment element 1730, which may correspond with element 246 as illustrated in FIG. 2, may be used to adjust the cracking or release pressure of the PRV. Conical sub-section 1725 is shown in its mounted position against a corresponding conical-shaped wall of body 1710. One or more O-rings or other sealing elements (not shown) may be positioned between the inner side of the conical sub-section 1725 and the conical-shaped wall of body 1710, such as in slots or grooves. FIG. 19B illustrates the embodiment of PRV 1700 from the bottom side with nut 1722 screwed downward on the threaded adjustment sub-section of the plunger. The nut 1722 may be adjusted by turning the adjustment element 1730, such as described with respect to FIGS. 20A & 20B.

FIG. 20A illustrates an example PRV pressure adjustment tool embodiment 2000. Tool 2000 includes an adjustment head 2010, which may include a hex or other shaped projection or recessed element that corresponds in shape with the adjustment element 1730 of the pressure relieve valve. Tool 2000 may include a handle or socket mount or other mechanism for coupling to a user handle or power-controlled adjustment shaft or element. In operation, as shown in FIG. 20B, the adjustment head 2010 of the tool couples with corresponding adjustment element 1730 of the valve so that the valve can be adjusted to a desired pressure. In the exemplary embodiment shown, a user twists the tool 2000, as with a standard screwdriver tool, to tighten or loosen the PRV nut, which correspondingly tightens or loosens the compression spring to vary the cracking pressure. The adjustment may be done on a test fixture where a desired release pressure is provided, and the user then turns the adjustment tool 2000 until the valve begins to release pressure at the desired pressure value. This process may also be automated so that the adjustment is done by an automatic adjustment tool similar to the manual tool 2000 shown in FIG. 20A and FIG. 20B.

Figure 21:
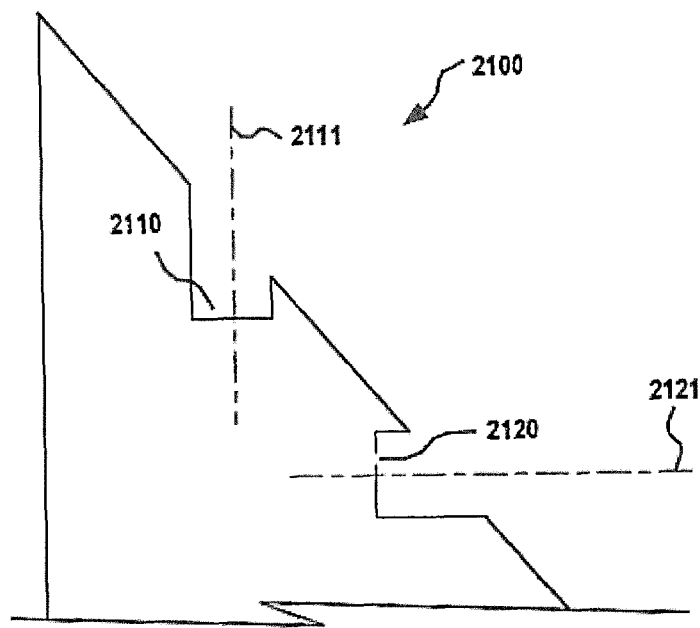
FIG. 21 illustrates details of an O-ring groove square cut along a vertical and horizontal axis relative to a conical seat.
Figure 22:
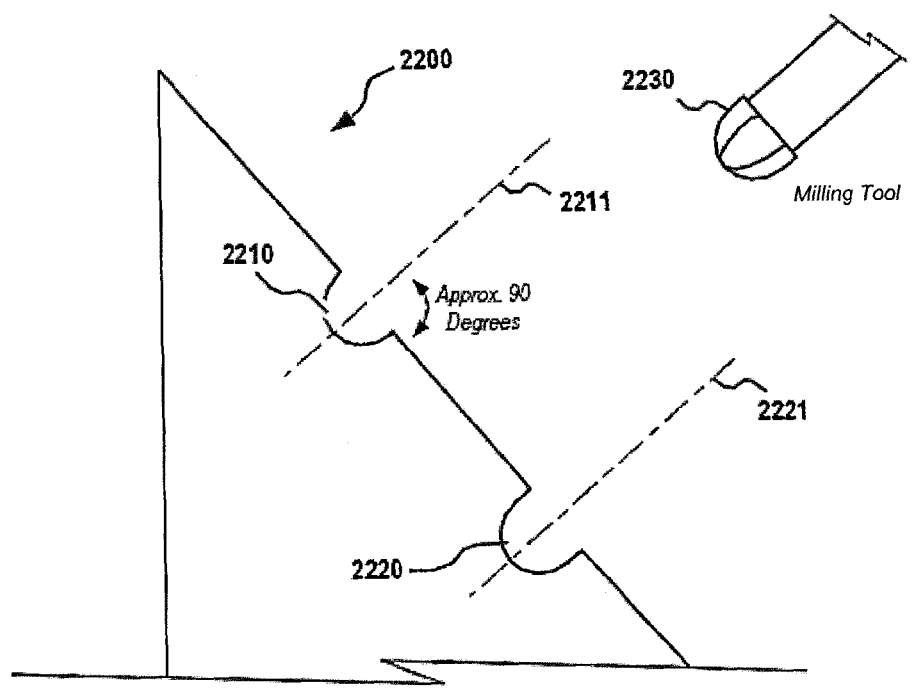
FIG. 22 illustrates details of an O-ring groove embodiment cut along an axis approximately perpendicular to a mating surface between a PRV body and a conical PRV plunger.

In an exemplary embodiment, the O-ring grooves or channels in the body may be advantageously formed at an angle normal to the surface of the body (as shown in FIG. 22) rather than in a traditional O-ring groove shape where the grooves are merely cut from a vertical or horizontal orientation (as shown in FIG. 21). In FIG. 21, traditional O-ring grooves 2110 and 2120 are shown. These grooves may be milled with square edges as shown and are typically cut with a milling tool or other device so that they are not perpendicular to the mating surface. The milling may be done along a vertical axis such as axis 2111 for groove 2110, or along a horizontal axis such as axis 2121 for groove 2120. In this configuration, the O-rings may not seal as well and/or may be subject to falling out of the grooves during assembly or maintenance and/or may be subject to other problems.

In order to provide an alternate groove or channel for the O-rings, such as the two O-rings shown between the conical shaped plunger and PRV body (e.g., grooves 228 and 232 of FIG. 2), the groove may be formed to be substantially orthogonal to the surface of the body. An example of this is shown in FIG. 22, where two grooves 2210 and 2220 are formed at approximately a 90 degree angle from the mating surface. The grooves may also have a rounded cross-section as shown, rather than a square or rectangular cross-section as shown with grooves 2110 and 2120 of FIG. 21. Angled and/or rounded grooves may be formed by a milling tool 2230 to cut the grooves at the desired angle and depth, and/or using other tools or methods as are known in the art.

In some embodiments, the sizes and/or depths of the grooves (e.g., grooves 2210 and 2220 of FIG. 22) may be varied to allow for different sealing and/or release pressures for each O-ring. For example, as shown in FIG. 22, groove 2220 is deeper than groove 2210. The groove sizes may also be different in various embodiments, and the installed O-rings may also be of different sizes or materials in various embodiments.

Figure 23:
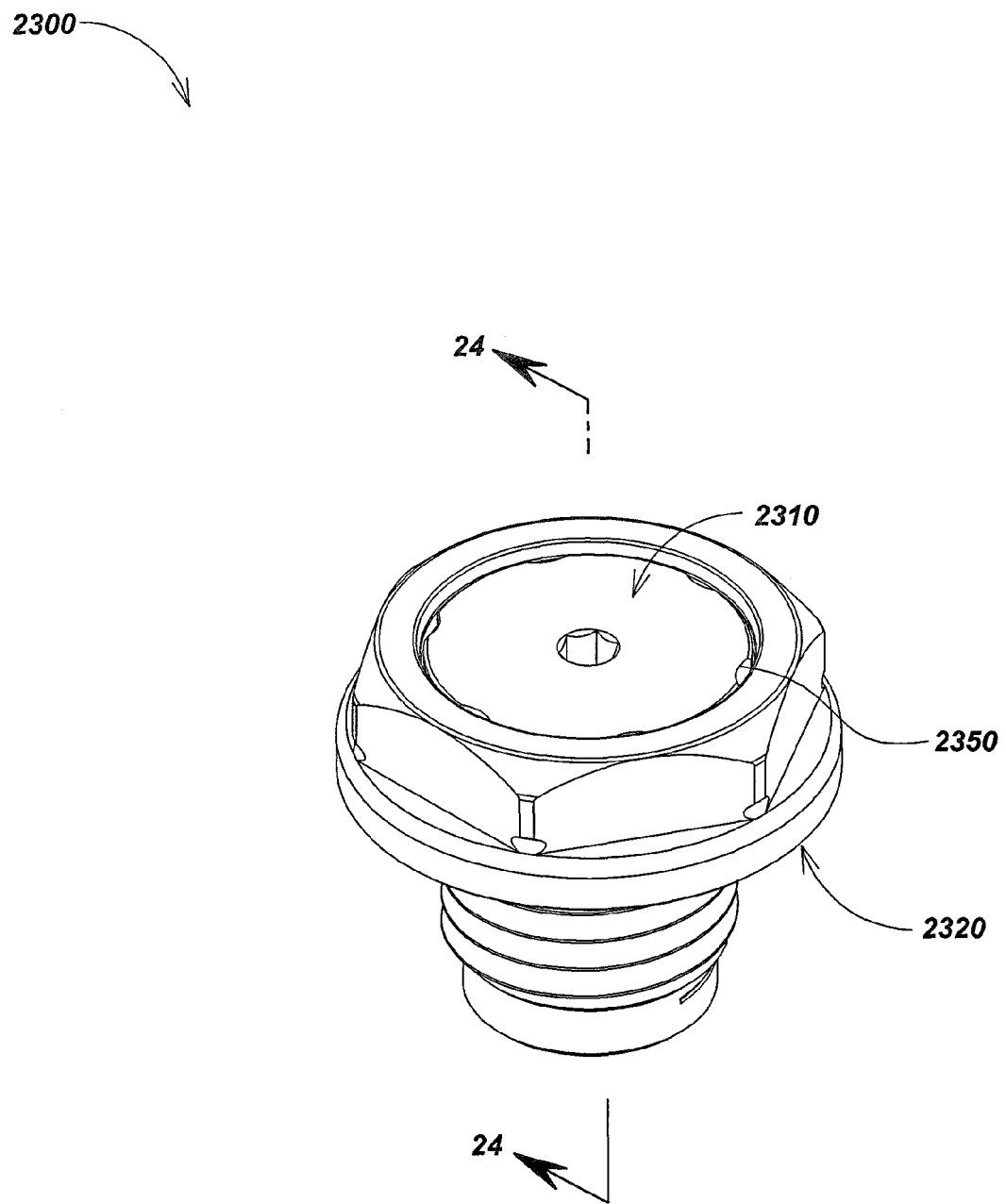
FIG. 23 is an isometric view of a PRV embodiment.
Figure 24:
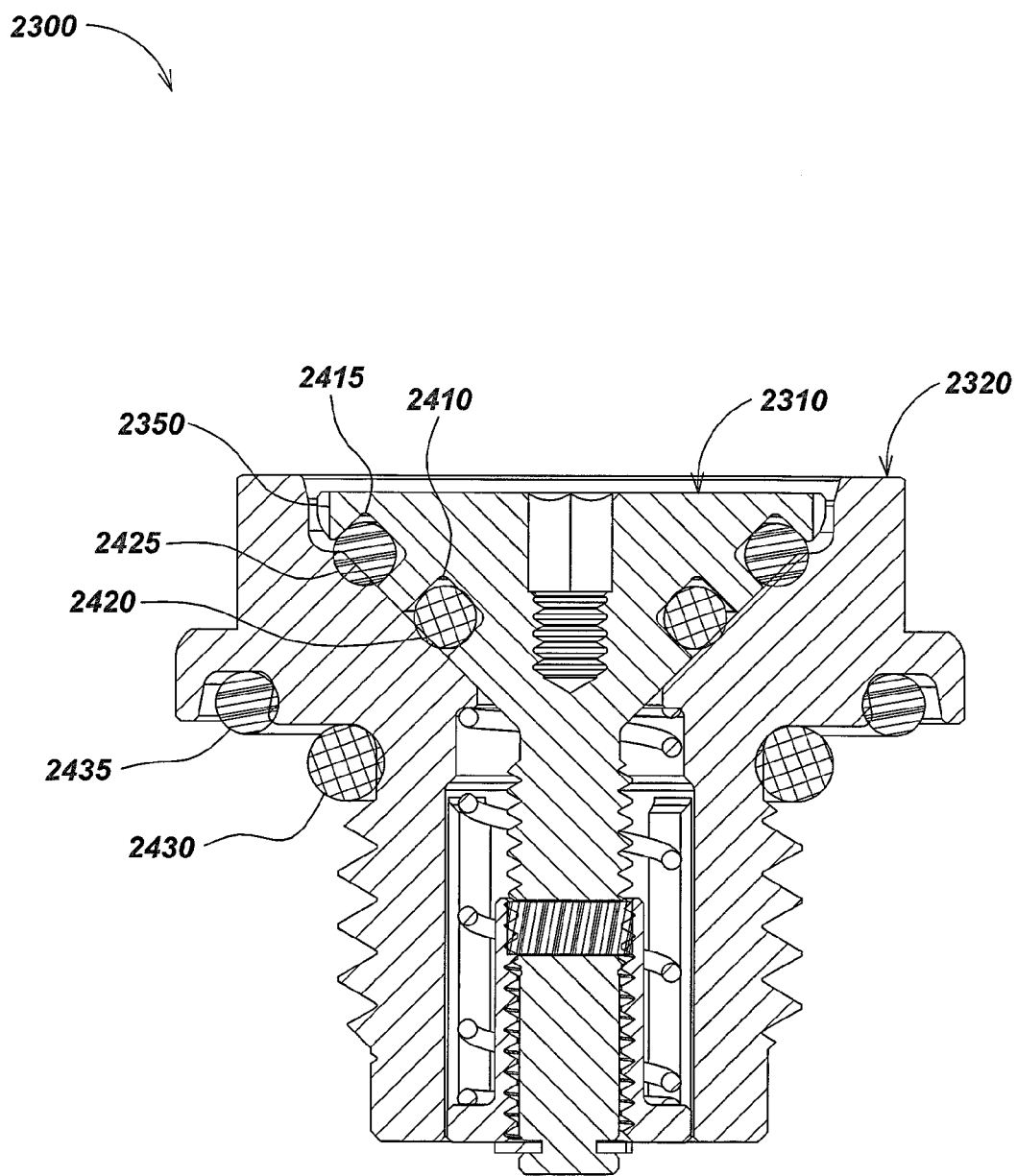
FIG. 24 is a sectional view of the PRV embodiment of FIG. 23 taken along line 24-24.
Figure 25:
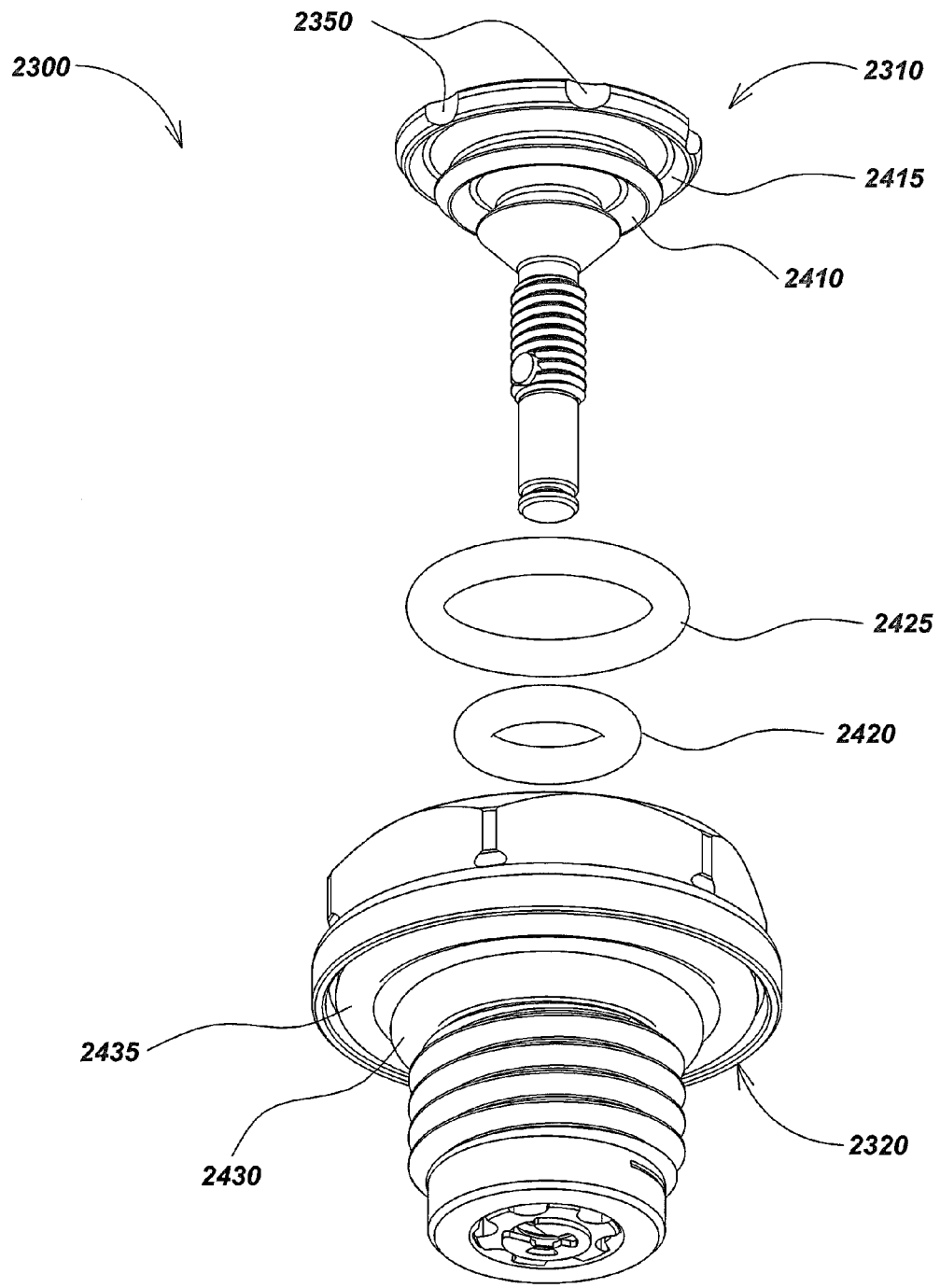
FIG. 25, is a partially exploded isometric view of the PRV embodiment from FIG. 23.

In some embodiments, such as those illustrated in FIGS. 23-25, O-rings may be seated onto the sealing surface of the plunger assembly rather than within the high pressure body assembly. One or more grooves and/or channels may be formed onto the conical surface of the plunger assembly. O-rings may, for example, be stretched to seat within grooves or channels during assembly. The elastomeric properties of such an O-ring may allow the O-ring to be held securely within the groove or channel. The plunger assembly, O-rings, and/or high pressure body assembly may be the same in all aspects as the plunger assemblies, O-rings, and/or body assemblies previously discussed herein with any of the various other embodiments but with the grooves or channels to seat O-rings relocated to the conical surface of plunger assembly rather than the body assembly. In yet other embodiments a combination of grooves/O-rings may be located both on the plunger assembly and the body assembly.

Referring to FIGS. 24 and 25, a PRV embodiment 2300 may comprise a plunger assembly 2310 and high pressure housing assembly 2320. The plunger assembly 2310 may be similar to the plunger assembly 1720 of FIGS. 17 and 18 but with grooves 2410 and 2415 formed along the conical seal surface and a series of pressure bypass divots 2350 formed evenly spaced along its outer circumference. O-rings 2420 and 2425 may be configured to seat within a groove 2410 and 2415 such that each seats securely within its respective groove. In the PRV embodiment 2300, the groove 2415 may be formed shallower than groove 2410. The high pressure housing assembly 2320 may be similar to the high pressure body assembly 1710 of FIGS. 17 and 18 but without grooves or channels to seat O-rings. When such a PRV embodiment 2300 is in a closed state, the plunger assembly 2310, with O-rings 2420 and 2425 seated thereto, may further be seated within the high pressure body assembly 2320. The plunger assembly 2310 may be held in position within the high pressure body assembly 2320 due to a force which may, for example, be provided by an internal spring such as the compression spring 1723 of FIGS. 17 and 18. A seal may thereby be created between the plunger assembly 2310 containing the O-rings 2420 and 2425 and the high pressure body assembly 2320 until internal pressure is made to overcome the spring force and open the PRV embodiment 2300. The PRV embodiment 2300 may again return to a closed state upon the spring force overcoming the force of any internal pressure.

Referring to FIGS. 23-26, pressure bypass divots 2350 formed along the circumference of the plunger assembly 2310 may be used to aid in retaining the outmost O-ring 2425. In instances where the O-ring 2425 begins to become dislodged from groove 2415 due, for instance, to the opening of PRV device 2300 in releasing high volume internal pressure, the pressure bypass divots 2350 may allow for an improved path for pressurized fluids and/or gases to move past the O-ring 2425 and through the pressure bypass divots 2350. In other embodiments, the quantity, position, shape, and pattern of such bypass features may be different and suited to the particular use of the PRV embodiment. Similar bypass grooves may further be used with the inner O-ring or O-rings to prevent them from also becoming unseated. In some embodiments, the various O-rings may comprise different compounds suited for the particular use and/or environment of use for a PRV device such as the various PRV embodiments illustrated herein.

For example, the innermost or internal environment facing O-rings on the PRV embodiment 2300 illustrated in FIGS. 24-25, the O-ring 2420 and O-ring 2430 disposed along the innermost circumference on the outside of the high pressure body assembly 2320 may each comprise a compound tailored to best tolerate use within a particular internal environment. Similarly, the outermost or external environment facing O-rings on the PRV embodiment 2300, the O-ring 2425 and O-ring 2435 disposed along an outmost circumference on the outside of the high pressure body assembly 2320, may comprise a different compound tailored to best tolerate use within a particular external environment.

For example, the use of different compounds in external and internal facing O-rings may be done to allow for durometer differences for sealing at low and high pressure and/or compounds suited to different external and internal chemistries and/or to meet various other needs of different internal and external environments. In some embodiments, such as the PRV embodiment 2300, the O-ring 2435 seated along an outmost circumference on the outside of the high pressure body assembly 2320 and O-ring 2425 seated in the shallow groove 2415 may comprise silicone, a material known to exhibit a high degree of resistance to compression set but which has relatively high permeability to gasses and small molecules. The O-ring 2430 seated along an inner circumference on the outside of the high pressure body assembly 2320 and O-ring 2420 seated in the deeper groove 2410 may comprise nitrile Viton® or similar compounds, which has poorer compression set resistance than silicone, but lower gas diffusion. In such an embodiment as the PRV embodiment 2300, the combined properties of the two seals may result in a higher performance device than either compound by itself. In other applications or embodiments various number of compounds and combinations of compounds may be used in the various O-rings of a PRV device in keeping with aspects of the present disclosure.

Still referring to FIGS. 24 and 25, the O-rings 2420 and 2425 may be of different sizes and/or the grooves 2410 and 2415 in which the O-rings are seated may be of different sizes and/or shapes and/or depths below the surface. In this way, the order of contact for each O-ring 2420 and 2425 and the differential pressure at which the second O-ring seals may be adjusted to suit different applications. In such embodiments O-rings 2420 and 2425 may be of the same cross-sectional diameter while groove 2410 may be deeper than groove 2415 such that when no differential pressure exists only O-ring 2425 is in contact. Further, the difference in depth between the inner groove 2410 and outer groove 2415 may be adjusted in order to change the differential pressure required to sufficiently compress O-ring 2425 to the point where O-ring 2420 will also make contact and seal.

Figure 26:
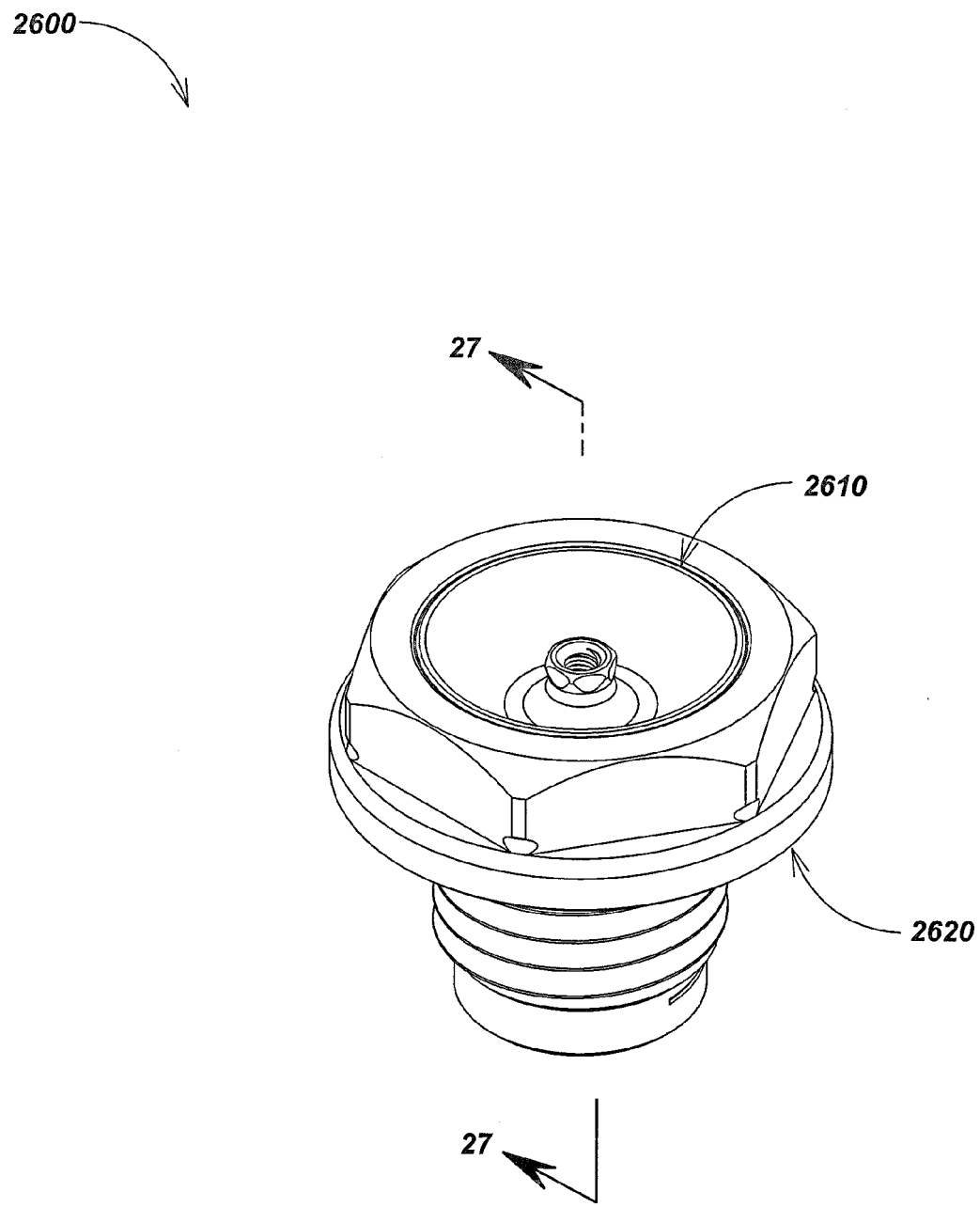
FIG. 26 is an isometric view of a PRV embodiment.
Figure 27:
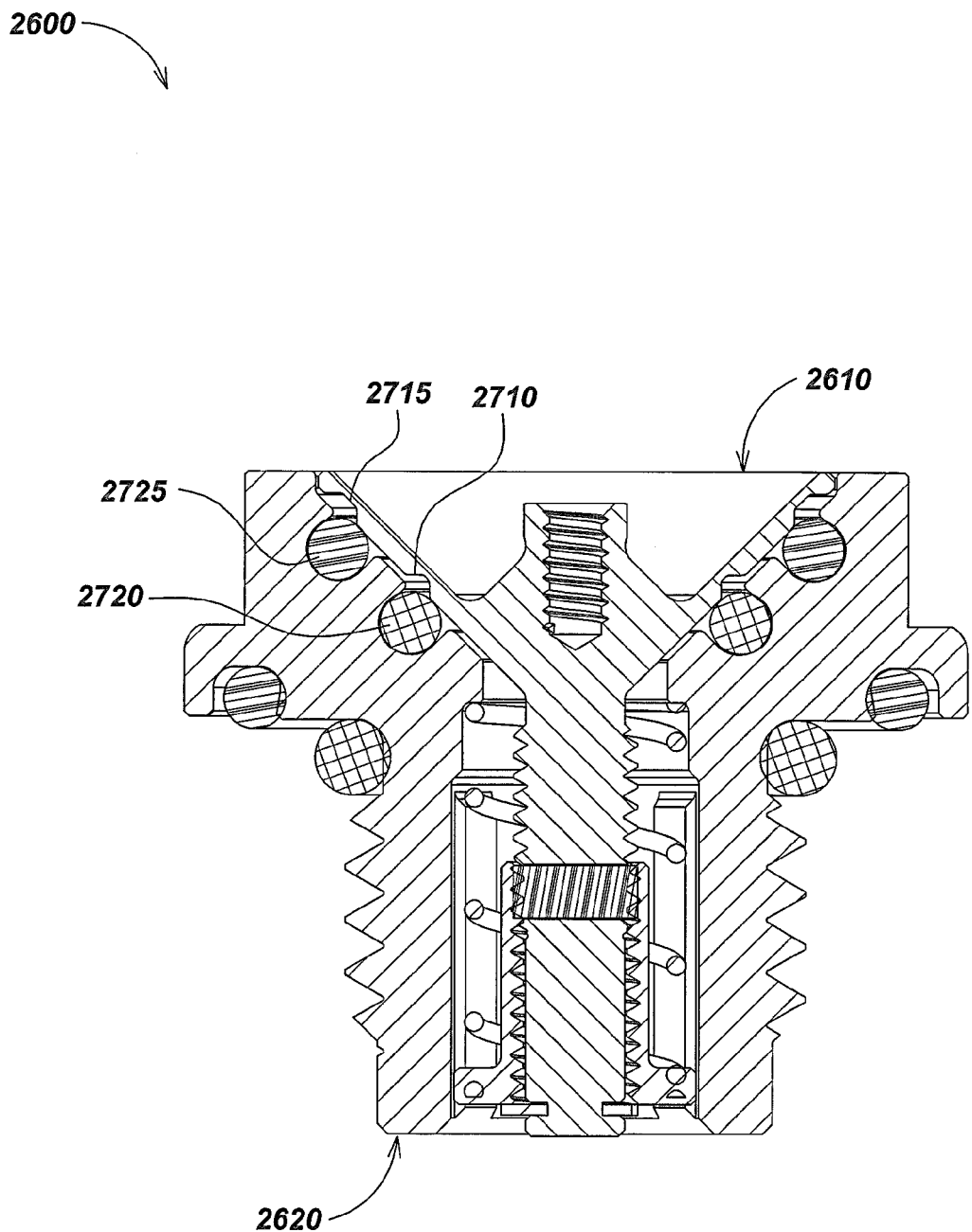
FIG. 27 is a sectional view of the PRV embodiment of FIG. 26 taken along line 27-27.
Figure 28:
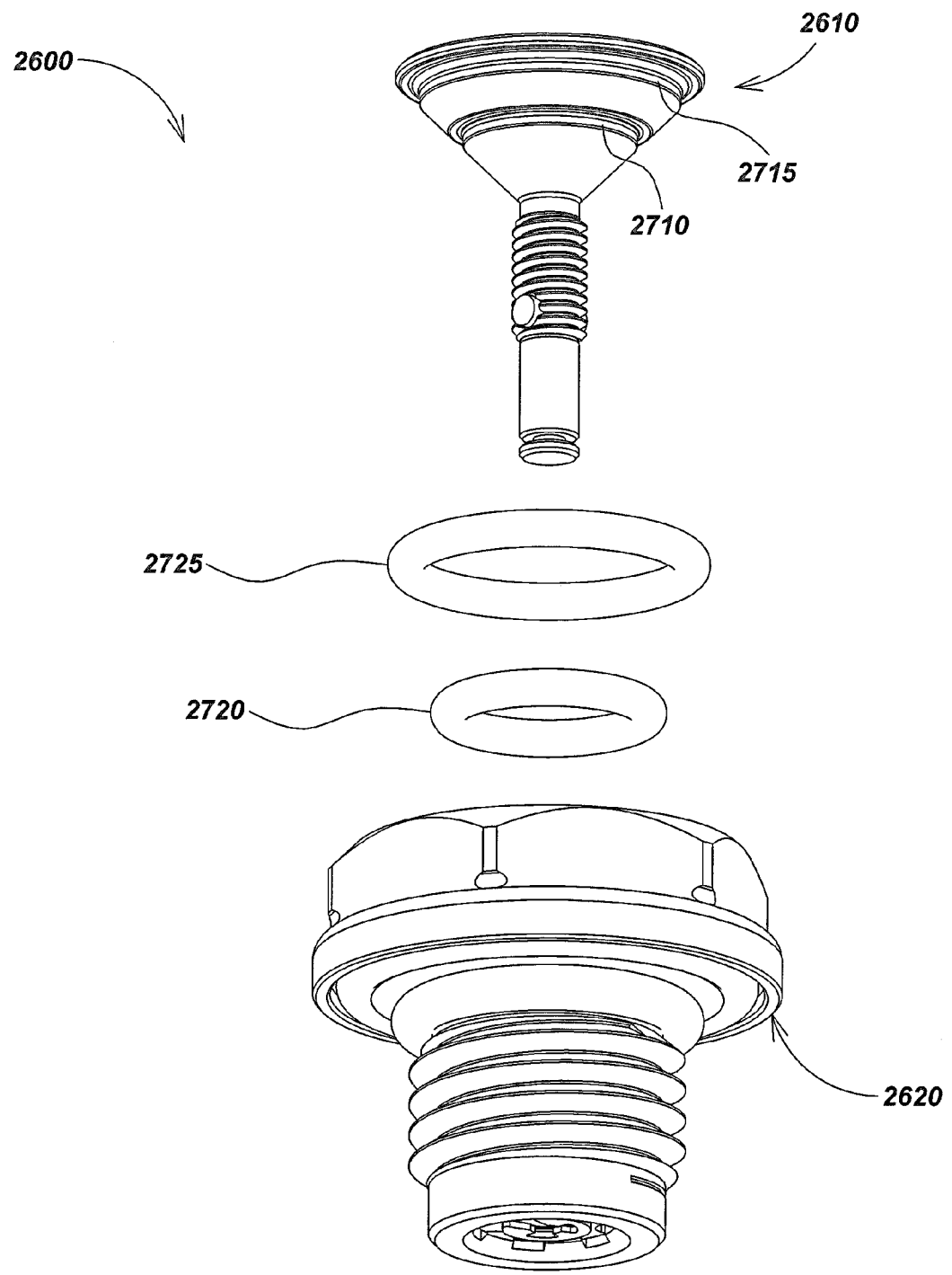
FIG. 28 is a partially exploded isometric view of the PRV embodiment from FIG. 26.

In further embodiments, such as those illustrated in FIGS. 26-28, which may correspond with details as shown in FIGS. 23-26, a series of O-ring relief features 2710 and 2715 may be formed along the component opposite the internal O-rings of a PRV embodiment. In one embodiment, the O-ring relief features 2710 and 2715 may be continuous annular grooves as shown in FIG. 28. In an alternate embodiment, the relief feature or features may comprise one or several cuts positioned outboard of the sealing diameter. In use, such O-ring relief features may help retain O-rings while the PRV device is in use.

The PRV embodiment 2600, as illustrated in FIGS. 27 and 28, may be comprised of a plunger assembly 2610 and a high pressure housing assembly 2620. The plunger assembly 2610 may be similar to the plunger assembly 1720 of FIGS. 17 and 18 but with annular O-ring relief features 2710 and 2715 formed along the conical sealing surface. The high pressure housing assembly 2620 may be similar to the high pressure body assembly 1710 of FIGS. 17 and 18. Each O-ring relief feature 2710 and 2715 may be positioned along the conical sealing surface of the plunger assembly 2610 slightly above a respective one of each O-ring 2720 and 2725 seated in grooves within the high pressure housing assembly 2620. In use, as internal pressure builds, O-rings 2720 and 2725 may push up and outward towards their respective O-ring relief feature 2710 and 2715. Each O-ring relief feature 2710 and 2715 may allow for an improved path for pressurized fluids and/or gases to move past each O-ring 2720 and 2725 and not prevent the O-rings 2720 and 2725 from becoming dislodged from their respective groove within the high pressure housing assembly 2620.

Pressure relief valves in accordance with the various aspects described herein may be used in a variety of applications that require venting. An exemplary application is for pressure housings used in underwater lighting or video recording. Alternate applications may include enclosures for rechargeable batteries, underwater instruments or sensors, as well as in other applications where devices which are pressure compensated and subject to high pressure, or where elements within the device generate internal pressure that needs to be vented. PRVs may be integral with such devices or disposed on or within device housings or bodies in various applications.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure and presently claimed invention. Thus, the invention is not intended to be limited to the aspects shown herein but is to be accorded the widest scope consistent with the appended Claims and their equivalents.

The invention claimed is:

1. A pressure relief valve for high pressure operation, comprising:
   a plunger assembly including an elongate threaded shaft at a first end and a compliant cone-shaped sub-section with a smooth faced sealing surface at a second end opposite the first end;
   a body for withstanding deep ocean external pressure of a depth of at least 1000 meters, the body including a cavity with a conical-shaped mating surface to receive the smooth-faced sealing surface of the plunger assembly, and a clip to restrain the plunger assembly at the second end;
   a compression spring disposed between a portion of the plunger assembly and the body sized to withstand corresponding pressures of at depth of at least 1000 meters; and
   one or more seals disposed between the body mating surface and the sealing surface of the plunger assembly; wherein the body mating surface and the sealing surface are held in contact by the compression spring.

2. The pressure relief valve of claim 1, wherein the plunger assembly includes an adjustment element coupled to the cone shaped sub-section of the plunger to adjust an actuation pressure and an adjustment nut, and wherein the adjustment element includes a threaded shaft onto which the adjustment nut is screwed to adjust the cracking pressure of the valve by adjusting the compressing spring force, and wherein a flat face of the cone shaped sub-section is held substantially flush with the exterior of the body when external pressure is applied.

3. The pressure relief value of claim 1, wherein the body includes an inner groove and an outer groove, and wherein the one or more seals comprise an inner O-ring and an outer O-ring correspondingly seated in the inner groove and the outer groove.

4. The pressure relief valve of claim 3, wherein the inner O-ring and the outer O-ring have substantially the same cross-sectional diameter.

5. The pressure relief valve of claim 3, wherein the inner O-ring and the outer O-ring have a different cross-sectional diameter.

6. The pressure relief valve of claim 3, wherein the inner O-ring and the outer O-ring comprise the same material.

7. The pressure relief valve of claim 3, wherein the inner O-ring and the outer O-ring comprise different materials.

8. The pressure relief valve of claim 3, wherein the inner groove and the outer groove are oriented along an axis substantially perpendicular to a mating surface of the conical shaped cavity.

9. The pressure relief valve of claim 8, wherein one or both of the inner groove and the outer groove have a rounded groove bottom.

10. The pressure relief valve of claim 8, wherein one or both of the grooves include an undercut edge to prevent dislodging of O-rings during high flow rate discharges.

11. The pressure relief valve of claim 1, wherein the cone shaped sub-section includes a thin compliant section configured to flex upon application of high applied pressures.

12. The pressure relief valve of claim 1, further comprising a thread locking element to maintain a set point during operation.

13. The pressure relief valve of claim 1, wherein the adjustment nut includes a plurality of anti-rotation fingers.

14. The pressure relief valve of claim 1, further comprising a protective cap disposed on the valve to prevent access to a cracking pressure adjustment element of the valve.

15. The pressure relief valve of claim 1, wherein the body includes a stop edge to prevent the compression spring from going beyond a predefined yield point.

16. The pressure relief valve of claim 15, wherein the seal comprises a flat gasket.

17. A pressure relief valve for high pressure operation, comprising:
an adjustment nut;
a plunger assembly including a compliant cone-shaped sub-section with a sealing surface, an adjustment element coupled to the conical shaped sub-section of the plunger to adjust an actuation pressure, and an adjustment nut;
a body for withstanding deep ocean pressure, the body including a cavity with a conical-shaped mating surface to receive the sealing surface of the plunger assembly;
a compression spring disposed between a portion of the plunger assembly and the body; and
one or more seals disposed between the body mating surface and the sealing surface of the plunger assembly;
wherein the body mating surface and the sealing surface are held in contact by the compression spring, the length of the anti-rotation fingers is preset to provide a predefined cracking pressure when the adjustment nut is jammed against the plunger, and the adjustment element includes a threaded shaft onto which the adjustment nut is screwed to adjust the cracking pressure of the valve by adjusting the compressing spring force.

18. An underwater lighting device, comprising:
a deep sea pressure housing for a light or camera; and
a pressure relief valve screwed into a threaded hole in the housing, comprising:
a plunger assembly including an elongate threaded shaft at a first end and a cone-shaped sub-section with a smooth faced sealing surface at a second end opposite the first end;
a body for withstanding deep ocean pressure, the body including a cavity with a conical-shaped mating surface to receive the smooth-faced sealing surface of the plunger assembly, and a clip to restrain the plunger assembly at the second end;
a compression spring disposed between a portion of the plunger assembly and the body; and
one or more seals disposed between the body mating surface and the sealing surface of the plunger assembly;
wherein the body mating surface and the sealing surface are held in contact by the compression spring.

19. A battery, comprising:
a battery housing; and
a pressure relief valve disposed in the battery housing to vent gases from within the housing, the pressure relief valve including:
a plunger assembly including an elongate threaded shaft at a first end and a cone-shaped sub-section with a smooth faced sealing surface at a second end opposite the first end;
a body for withstanding deep ocean pressure, the body including a cavity with a conical-shaped mating surface to receive the smooth-faced sealing surface of the plunger assembly, and a clip to restrain the plunger assembly at the second end;
a compression spring disposed between a portion of the plunger assembly and the body; and
one or more seals disposed between the body mating surface and the sealing surface of the plunger assembly;
wherein the body mating surface and the sealing surface are held in contact by the compression spring.

* * * * *